(12) United States Patent
West et al.

(10) Patent No.: US 7,758,773 B2
(45) Date of Patent: *Jul. 20, 2010

(54) NON-SYNTHETIC METHOD FOR MODIFYING PROPERTIES OF LIQUID CRYSTALS

(75) Inventors: John L. West, Hartville, OH (US); Chae Il Cheon, Seoul (KR); Anatoliy V. Glushchenko, Colorado Springs, CO (US); Yuriy Reznikov, Kyiv (UA); Fenghua Li, Kent, OH (US)

(73) Assignee: Kent State University, Kent, OH (US)

( * ) Notice: Subject to any disclaimer, the term of this patent is extended or adjusted under 35 U.S.C. 154(b) by 148 days.

This patent is subject to a terminal disclaimer.

(21) Appl. No.: 11/686,141

(22) Filed: Mar. 14, 2007

(65) Prior Publication Data

US 2007/0200093 A1    Aug. 30, 2007

Related U.S. Application Data

(63) Continuation-in-part of application No. 10/471,195, filed as application No. PCT/US03/00861 on Jan. 10, 2003.

(60) Provisional application No. 60/347,475, filed on Jan. 10, 2002.

(51) Int. Cl.
C09K 19/00 (2006.01)
C09K 19/06 (2006.01)
C09K 19/52 (2006.01)

(52) U.S. Cl. .............. 252/299.01; 430/20; 349/171; 349/172; 349/184; 428/1.1; 428/1.2; 428/1.3

(58) Field of Classification Search .......... 349/171, 349/172, 184; 428/1.1–1.3; 252/299.01; 430/20

See application file for complete search history.

(56) References Cited

U.S. PATENT DOCUMENTS

| | | | |
|---|---|---|---|
| 4,417,785 A | | 11/1983 | Nakamura |
| 4,701,024 A | | 10/1987 | Kobayashi et al. |
| 5,434,685 A | | 7/1995 | Pirs et al. |
| 5,447,659 A | | 9/1995 | Higashii et al. |
| 5,515,190 A | | 5/1996 | Ogawa et al. |
| 5,540,858 A | * | 7/1996 | Yoshinaga et al. ..... 252/299.01 |
| 5,729,320 A | | 3/1998 | Eidenschink et al. |
| 5,817,255 A | | 10/1998 | Tanaka et al. |
| 5,923,394 A | | 7/1999 | Miyazaki et al. |
| 6,108,061 A | * | 8/2000 | Sako et al. ................ 349/85 |
| 6,127,283 A | | 10/2000 | Gal-Or et al. |
| 6,130,190 A | | 10/2000 | Gunsel et al. |
| 6,160,788 A | | 12/2000 | Kobayashi et al. |
| 6,409,983 B1 | | 6/2002 | Choi et al. |
| 6,462,796 B1 | | 10/2002 | Kabe et al. |
| 7,346,248 B2 | * | 3/2008 | Atwater et al. ............ 385/122 |
| 2003/0081162 A1 | | 5/2003 | Miller |
| 2004/0156008 A1 | * | 8/2004 | Reznikov et al. ........... 349/163 |
| 2007/0200093 A1 | | 8/2007 | West et al. |

FOREIGN PATENT DOCUMENTS

| | | |
|---|---|---|
| JP | 01-142713 | 6/1989 |
| JP | 01-267516 | 10/1989 |
| JP | 03160415 | 7/1991 |
| JP | 04-180021 | 6/1992 |
| JP | 04 180021 A | 6/1992 |
| JP | 04180021 A | 6/1992 |
| JP | 08-062586 | 3/1996 |
| JP | 2003050385 | 2/2003 |

OTHER PUBLICATIONS

Bachmann, R. And Bärner, K., "Stable suspensions of ferroelectric $BaTiO_3$-Particles", *Solid State Communications*, vol. 68, No. 9, pp. 865-869, 1988. Pergamon Press plc. Great Britain.

Müller, J.-u and Bärner, K., "Polydisperse Suspensions of $BaTiO_3$-Particles", *Ferroelectrics*, vol. 108, pp. 83-88, 1990. Gordon and Breach Science Publishers S.A., USA.

Reznikov, Y., Buchnev, O., and Tereshchenko, O., "Ferroelectric nematic suspension", *Applied Physics Letters*, vol. 82, No. 12, pp. 1917-1919, Mar. 2003. © 2003 American Institute of Physics.

(Continued)

*Primary Examiner*—Geraldina Visconti
(74) *Attorney, Agent, or Firm*—Fay Sharpe LLP

(57) ABSTRACT

This disclosure outlines a new method of modifying the properties of existing liquid crystals by doping them with ferroelectric micro- and nanoparticles. We show that this approach, in contrast to the traditional time consuming and expensive chemical synthetic methods, enriches and enhances the electro-optical performance of many liquid crystal materials. We demonstrate that by changing the concentration and type of ferroelectric particles the physical properties of the nematic, smectic, and cholesteric liquid crystal materials can be changed, including the dielectric constants, the birefringence, the phase transition temperatures, and even the order parameter. We also demonstrate the performance of these new materials in various devices, including displays, light modulators, and beam steering devices.

32 Claims, 26 Drawing Sheets

OTHER PUBLICATIONS

Schurian, A. and Bärner, K., "Stable Suspensions of Ferroelectric nm-$LiNbO_3$-andnm-$PbTiO_3$-Particles in Hydrocarbon Carrier Liquids", *Ferroelectric Letters*, vol. 20, pp. 169-176, 1996. © OPA (Overseas Publishers Association) Amsterdam B.V.

Schurian, A., Söder, J., Bärner, K., and Lin, Jun, "Scattering cell based on ferroelectric nm-particle suspensions", *Journal of Electrostatics* 40 & 41, pp. 205-210, 1997. © Elsevier Science B.V.

Anatoliy Glushchenko et al., "Applications of ferroelectric particles/liquid crystal colloids"; XP-002486847, Database Compendex (On-line) Engineering Information, Inc., New York, NY, US, Database accession No. E20072110615456 (Published on-line Sep. 2, 2007) and Proc SPIE Int Soc Opt Eng, Proceedings of SPIE—The International Society for Optical Engineering, Emerging Liquid Crystal Technologies II 2007, Vo. 6487, Feb. 9, 2007.

International Search Report for International Application No. PCT/US2008/056802.

\* cited by examiner

NON-SYNTHETIC METHOD FOR MODIFYING PROPERTIES OF LIQUID CRYSTALS The present application is a continuation-in-part of and claims priority from and the benefit of the priority of U.S. patent application Ser. No. 10/471,195, filed on Mar. 25, 2004, which claims priority to PCT/US03/00861, filed Jan. 10, 2003, which claims priority from U.S. Provisional Patent Application Ser. No. 60/347,475, filed Jan. 10, 2002.

BACKGROUND

Liquid crystals (LC) consist of anisotropic molecules. The average direction of the long molecular axes is called the director, d. Reorientation of the director caused by the application of an external electric field is the basis of operation of most LC devices. The basic unit of LC devices is a LC cell, which consists of two substrates with LC material sandwiched in between.

The sensitivity of a LC material to an applied electric field is determined by the dielectric anisotropy, $\Delta\varepsilon$, and spontaneous polarization, P. P has a nonzero value only for some chiral smectic LC phases. The higher the $\Delta\varepsilon$ and P, the lower are the operating voltage and the faster the electro-optical response of the LC device and thereby, the faster the switching time between light and dark states of the LC cell.

Nematic LC's are the most commonly used LC materials. Their electro-optical response is typically related to the square of the electric field. To increase $\Delta\varepsilon$ and P, multi-component LC mixtures have been developed and special molecular dopants have been synthesized. This approach is extremely laborious and very expensive.

The rapid growth of portable devices incorporating liquid crystal displays has increased the demand for ever better liquid crystal materials. This has put a great demand on the design and synthesis of new LC materials. For example, the typical value of the dielectric anisotropy $\Delta\varepsilon$ for many liquid crystals is now about 20. The typical value of the birefringence $\Delta n$ for most liquid crystals is about 0.2. While liquid crystals with $\Delta\varepsilon \sim 40\text{-}50$ and $\Delta n \sim 0.4$ have recently been reported they have yet to be achieve all of the properties required for successful commercialization. In addition, it may be desired to change the dielectric anisotropy of a liquid crystal without changing its birefringence, or vice versa. It is difficult to do this by traditional chemical synthetic methods because those two characteristics are related. Next, very often it is desired to keep the mentioned parameters but change or tailor the phase transition points of a liquid crystal to some particular applications or a temperature range. All the described changes of the parameters of existing liquid crystals require long research effort of many specialists and significant financial investments.

It is known that the sensitivity of isotropic liquids to an applied electric field can be increased by doping with ultra-fine (less than 1 micrometer (µm) size) ferroelectric particles. Ferroelectric particles are particles which have a spontaneous electric polarization that is reversible by an electric field. For example, Bachmann and Barner showed that ferroelectric $BaTiO_3$ particles that have been finely milled in the presence of surfactant will form a stable suspension in heptane ("Stable Suspensions of Ferroelectric $BaTiO_3$-Particles," *Solid State Communications*, 68(9), 865-869 (1988)). The particles had an average radius of about 10 nm and carried a permanent dipole moment of about 2000 De. The birefringence of the suspension, which is impossible to achieve in a pure heptane matrix, was controlled by application of an electric field.

Similar effects were observed when ferromagnetic particles were imbedded in anisotropic materials. For example, it has been shown that dispersed ferromagnetic particles greatly enhance the magnetic properties of liquid crystals. At the same time, large ($\geq\mu m$) particles form defects, producing large director deformations in liquid crystals. Ensembles of these particles and defects can form complex structures. High concentrations (>2-3% by weight) of sub-micron particles can create almost rigid liquid crystal suspensions.

In the parent application (Patent Publication No. US20040156008), followed by an article published in APL (Yu. Reznikov, O. Buchnev, O. Tereshchenko, V. Reshetnyak, A. Glushchenko, and J. West, "Ferroelectric nematic suspension" Applied Physics Letters, Vol. 82, No 12, p.p. 1917-1919, 2003), the inventors demonstrated that at low concentrations, liquid crystal/ferroelectric particle suspensions behave as a pure liquid crystal with no evidence of the dissolved particles other than the enhanced properties. These dilute suspensions are stable, because the nano-particles do not significantly perturb the director field in the liquid crystal, and interaction between the particles is weak. We described that doping a nematic liquid crystal with ferroelectric nano-particles produces enhanced dielectric anisotropy and sensitivity of a nematic based suspension to the polarity of an applied electric field.

The present invention is directed toward fast and simple modification of the properties of existing liquid crystal materials by doping them with ferroelectric particles of various kinds. In addition to the dielectric anisotropy, the particles influence optical anisotropy, phase transition temperatures, and order parameter of liquid crystals.

In the present application, we report an alternative, easier, and more elegant approach than that described previously. We modify the properties of existing liquid crystals by adding inorganic particles. Particles of small enough size to share their intrinsic properties with the whole liquid crystal matrix, thereby behaving much like a molecular additive. We can tune the properties of the liquid crystals and thereby enhance the performance of a wide variety of devices. These particle composites can be also combined with polymers to create polymer dispersions, like polymer network liquid crystals, PDLC, and Stressed Liquid Crystals. The new materials are of a high importance for display industry, creation of adjustable lenses, beam steering and other light controlling devices.

BRIEF SUMMARY

Figure 1:
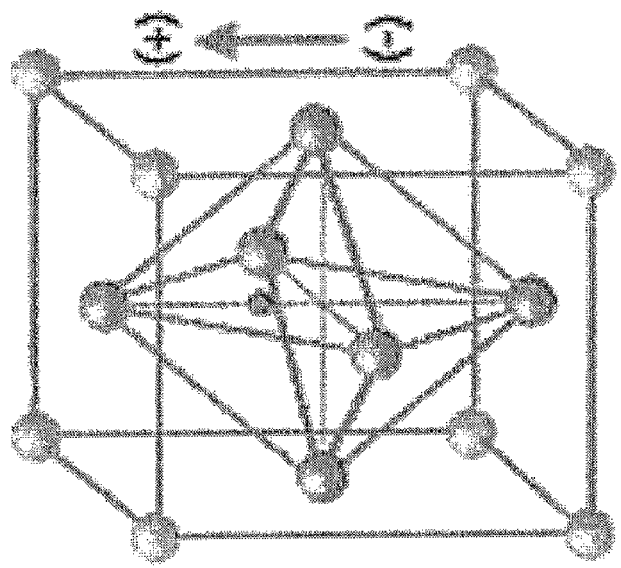
FIG. 1 is a depiction of a tetragonal crystal structure, as exhibited by $BaTiO_3$.

In one embodiment, there is provided a liquid crystal material comprising a suspension of anisotropic ferroelectric particles in a liquid crystal, wherein said ferroelectric particles function to change at least one of the following properties of the suspension when compared to the pure liquid crystal: i) the dielectric anisotropy; ii) the phase transition temperature; iii) the birefringence; and iv) the order parameter.

In a second embodiment, there is provided a method to change at least one property of a host liquid crystal by adding ferroelectric particles to said liquid crystal to create a suspension, wherein the amount of change can be controlled by altering the type, concentration, size of the ferroelectric particles, and/or suspension preparation conditions, said property selected from at least one of: i) the dielectric anisotropy; ii) the phase transition temperature; iii) the birefringence; and iv) the order parameter.

In a third embodiment, there is provided a method for fabricating a liquid crystal material according to the first embodiment by a process including the steps of: (i) milling large-sized or agglomerates of a ferroelectric powder, optionally with a surfactant agent, in an organic solvent to create a stable suspension; (ii) mixing a desired fraction of the suspension with a liquid crystal material.

In a fourth embodiment, there is provided a liquid crystal device comprising: (i) a pair of opposed substrates, each substrate having an associated electrode facing the other substrate; and (ii) a liquid crystal material according to the first embodiment disposed between the pair of substrates.

DETAILED DESCRIPTION OF THE PREFERRED EMBODIMENTS

The present invention is directed toward liquid crystal devices consisting of ferro-particles suspended in a liquid crystal (LC) material. The liquid crystal device can be used for information displays, electro-optical devices, telecommunication systems and optical processing. To stabilize the suspension, a polymer network may be included in the suspension. The ferroelectric LC suspensions possess advanced electro-optic characteristics in comparison to traditional materials and devices.

In the present invention, ultra-fine ferroelectric particles are added to a LC material to improve and control the electro-optical characteristics. Optimally, the ferroelectric particles are smaller than the limits of unaided human vision, thereby providing increased speed and sensitivity to an electric field without harming the appearance of a LCD. The particle should also be small enough to incorporate into the LC matrix without disturbing the orientation of the LC. Typically, the particles are, on average, smaller than 1 μm in any dimension, preferably 0.5 μm or less. In one particular example, the particles have an average diameter of about 200 nm or less. In another example, the particles have an average diameter of about 20 nm or less. In still another example, the particles have an average diameter of about 10 nm.

Ferroelectric particles possess an extra high dielectric anisotropy, $\Delta\in^{ferro}$, and have a spontaneous polarization, P, at temperatures less than the Curie temperature ($T_{Curie}$), the temperature at which the spontaneous polarization of ferroelectric material disappears. The Curie temperature will vary with the ferroelectric material, but in one embodiment is preferably lower than about 110° C. For example, $T_{Curie}$ for $BaTiO_3$ is about 108° C., while for $Sn_2P_2S_6$, $T_{Curie} \approx 66°$ C.

Owing to their anisotropic properties, ferro-particles are orientationally ordered in the anisotropic LC matrix. Although not wishing to condition patentability on any particular theory, it is believed that interaction between the particle and the director of the LC causes a collective response of the suspension to an applied electric field. The effective value of the dielectric anisotropy of the suspension can be roughly estimated as $\Delta\in_{eff}^{susp} \approx \Delta\in^{LC}+C\cdot\Delta\in^{ferro}$, where C is the volume ratio of ferro-particles to LC matrix. Since the value $\Delta \in^{ferro}$ can be of the order of $10^3$-$10^4$ and the value $\Delta \in$ is of the order of 10, one can produce $\Delta \in_{eff}^{susp}$ of a value up to about 100 for C in the range of about $10^{-1}$ to about $10^{-2}$. The added particles therefore decrease the operating voltage of LC devices and increase the switching speed of the LC suspension.

Application of an electric field may align the suspension of ferro-particles in the nematic LC due to dipole ordering of the ferro-particles. In this case, in addition to the dielectric quadratic response proportional to $\Delta \in^{susp} E^2$, a linear electric response proportional to P·E appears. It results in a faster response and lower driving voltage of the suspension.

The basic procedure of producing a suspension of ferroelectric particles in a LC may include the following steps:

A) Milling of the ferroelectric material. Grains of ferroelectric powder are mixed with a slow evaporating liquid carrier (e.g. heptane, kerosene etc.) and a surfactant agent. The mixture is milled until an ultra-fine size of the particles covered with the surfactant molecules is obtained.

B) Fractionalization of the suspension in a liquid carrier. After milling the mixtures largest particles may be removed by sedimentation. The homogeneous fraction of the resulting suspension is segregated in a column where particles of different size are separated by gravity forces.

C) Producing of the suspension in a liquid crystal. The suspension in a liquid carrier is mixed with a liquid crystal (it may be any kind of thermotropic LC which is miscible with the carrier) followed by evaporating of the carrier.

D) Additional stabilization of the suspension. Including a polymer network may additionally stabilize the resulting suspension. For example, a photopolymerizable material is added to the suspension and an LC cell filled with the suspension is irradiated with UV light. In another example, a polymerizable material is added to the suspension and phase separation of the polymerizable material is induced, such as by cooling, with subsequent or concurrent polymerization of the polymerizable material.

The procedure can be varied in details. For example, the grain of ferro-particles can be mixed with a surfactant without liquid carrier, and a LC matrix itself can serve as a liquid carrier.

Any type of LC material may be used in the suspension of this invention. Although examples are presented using nematic liquid crystal material, the invention is not limited thereto. Accordingly, the LC may be selected from other types of liquid crystal material including nematic, chiral nematic, and smectic liquid crystal materials, among others.

As mentioned above, ferroelectric particles are particles which have a spontaneous electric polarization induced by an applied electric field. Any particle that has this property may be utilized in the present invention. Non-limiting examples of suitable ferroelectric particles include particles of $LiNbO_3$, $PbTiO_3$, $BaTiO_3$, and $Sn_2P_2S_6$. Other particles may also be used provided that they exhibit a spontaneous electric polarization.

The ferroelectric particles may be present in the suspension in an amount which permits the ferroelectric particles to be suspended without significant aggregation of the particles. This will, at least in part, depend on the surfactant or other material used to prevent aggregation. In one example, the ferroelectric particles are suspended in the liquid crystal material at a percentage of about 4 percent by weight or less compared to the liquid crystal material. In another example, the ferroelectric particles are suspended in the liquid crystal material at a percentage of about 1 percent by weight or less compared to the liquid crystal material. In still another example, the ferroelectric particles are suspended in the liquid crystal material at a percentage of about 0.5 percent by weight or less compared to the liquid crystal material.

The suspension of ferroelectric particles in a liquid crystal material may additionally comprise a polymerizable material. The polymerizable material may be polymerized within the cell. When a polymerizable material is present, the method of the present invention additionally comprises the step of inducing polymerization of the polymerizable material. The method may additionally comprise the step of inducing phase separation of the polymer and liquid crystal material, for example, by cooling the mixture.

In creating a liquid crystal cell according to the present invention, the ferroelectric particle/LC suspension may be disposed between a pair of facing substrates, at least one of which is transparent. The cell may also contain an electrode disposed on the facing surface of each of the substrates to produce an electric field within the cell. The electrodes also may be transparent, such as those made of indium or indium tin oxide (ITO). The electrodes can be continuous on the surface of the substrate, or they may be patterned in a variety of ways, including interdigitated rows and columns. The substrates may additionally comprise an alignment layer on the facing surface of the substrate.

To demonstrate the effectiveness of the present invention, several ferroelectric particle suspensions in liquid crystal material were made as follows. The following examples should not be viewed as limiting the scope of the invention. The claims will serve to define the inventions.

The procedure of producing new materials depends on a particular application and may vary in details. To describe the preparation and properties in general, we will use an example with particular materials.

We consider two kinds of ferroelectric nanoparticles: tin-hypodiphosphate ($Sn_2P_2S_6$) particles and barium titanate ($BaTiO_3$) particles. The $Sn_2P_2S_6$ particles are slightly anisotropic and their size is about 200 nm. $Sn_2P_2S_6$ single crystals have a spontaneous polarization of 14 $\mu C/cm^2$ parallel to the [101] direction of the monoclinic cell. The dielectric constant of the $Sn_2P_2S_6$ along the main axis strongly depends on the quality of the samples and varies from 200 for ceramic samples to 9000 for monodomain crystals. We selected $Sn_2P_2S_6$ for its low Curie temperature ($T_{Curie} \approx 66°$ C., which is below the clearing temperature, $T_c$, of many nematic liquid crystal mixtures) to check the influence of ferroelectric nature of the particles on the properties of the mixtures. $BaTiO_3$ single crystals have tetragonal crystal structure as shown in FIG. 1, with [001] polar axis and a spontaneous polarization of 26 $\mu C/cm^2$ at room temperature. The dielectric constant of the $BaTiO_3$ single crystal is 168 in the direction parallel to polar axis and 2920 perpendicular to the polar axis. We used $BaTiO_3$ nanopowder with an average size of 30-50 nm and isotropic polyhedron particle shapes.

Figure 2:
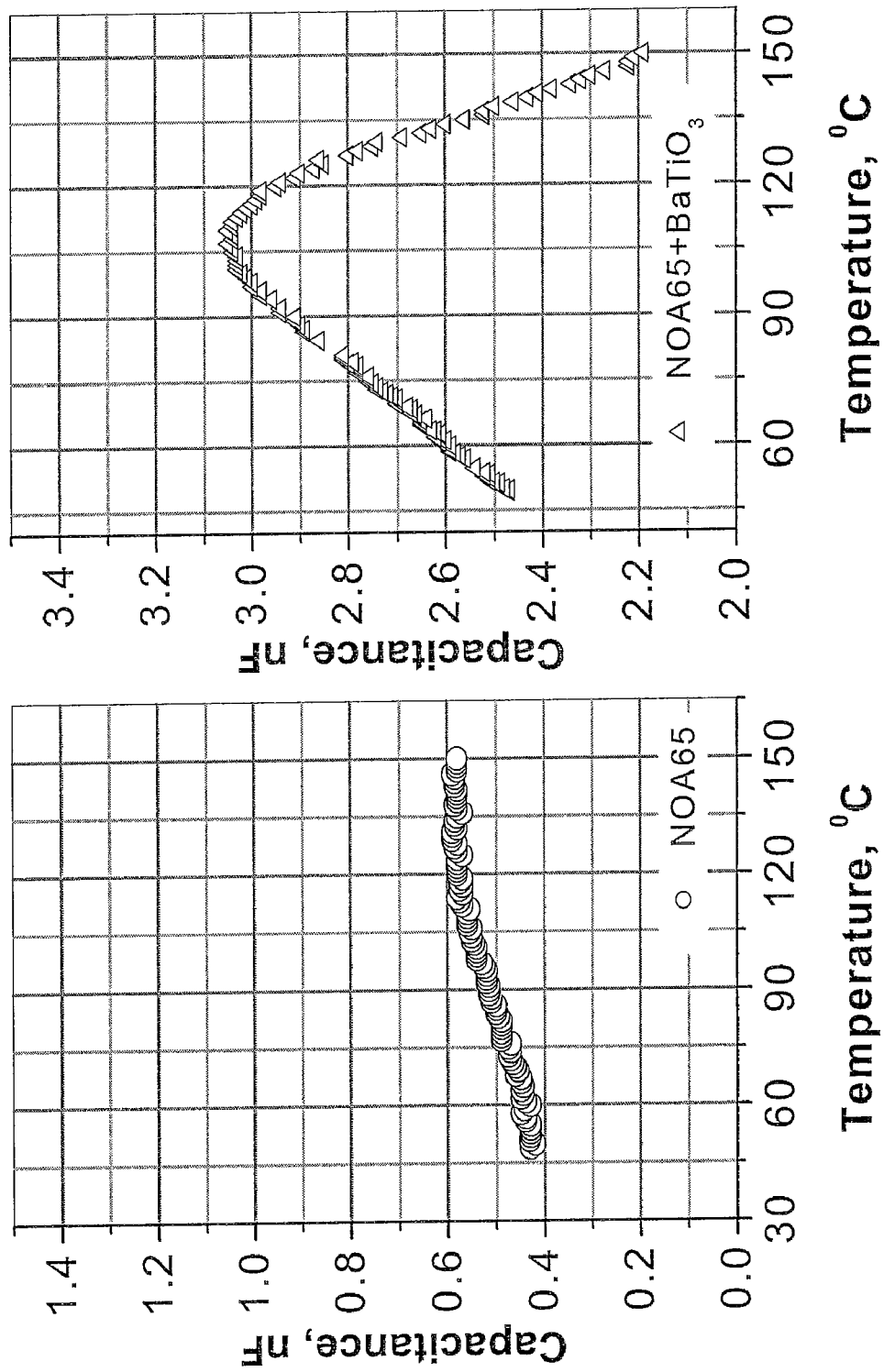
FIG. 2 shows the dependence of the capacitance on the temperature: a) for the pure crosslinked NOA65 material; b) for the polymerized mixture of NOA65 (60 wt. %)+$BaTiO_3$ nanoparticles (40 wt. %) in the vicinity of the Curie temperature.

It is known that the ferroelectric properties of nano-particles exist only down to particle sizes on the order of tens of nanometers. Because the nano-sized $BaTiO_3$ particles are close to this size, we checked for their ferroelectric properties by measuring the effective dielectric constant of the particles in the vicinity of the Curie temperature. About 40 wt % of the particles was mixed with NOA65 as a dielectric binder. The temperature dependence of the capacitance is shown in FIG. 2. It is clear that for the pure binder matrix the capacitance increases only slightly with temperature (FIG. 2, a), while for the particle mixture we observed a temperature dependence with a peak at 110° C. (FIG. 2, b), indicating that the nano-sized $BaTiO_3$ particles are ferroelectric at room temperature. The nano-sized $BaTiO_3$ mixture shows a broader dielectric peak than the $BaTiO_3$ single crystal. The broad dielectric anomaly may be due to a large amount of the binder in the mixture and the small particle size of $BaTiO_3$.

We used the following liquid crystals:
a) nematic liquid crystal mixture ZLI-4801 (Merck) with a temperature of transition to the isotropic $T_c=93°$ C., and a low dielectric anisotropy ($\in_a^{ZLI}=3.2$), which allows us to highlight the contribution from the ferroelectric particles;
b) the nematic liquid crystal 5CB (available commercially from Merck);
c) the negative nematic liquid crystal mixtures NLC1 and NLC2 for VA LCD mode;
d) cholesteric liquid crystal mixture BL061 (Merck);
e) smectic liquid crystal 8CB (Merck).

Figure 3:
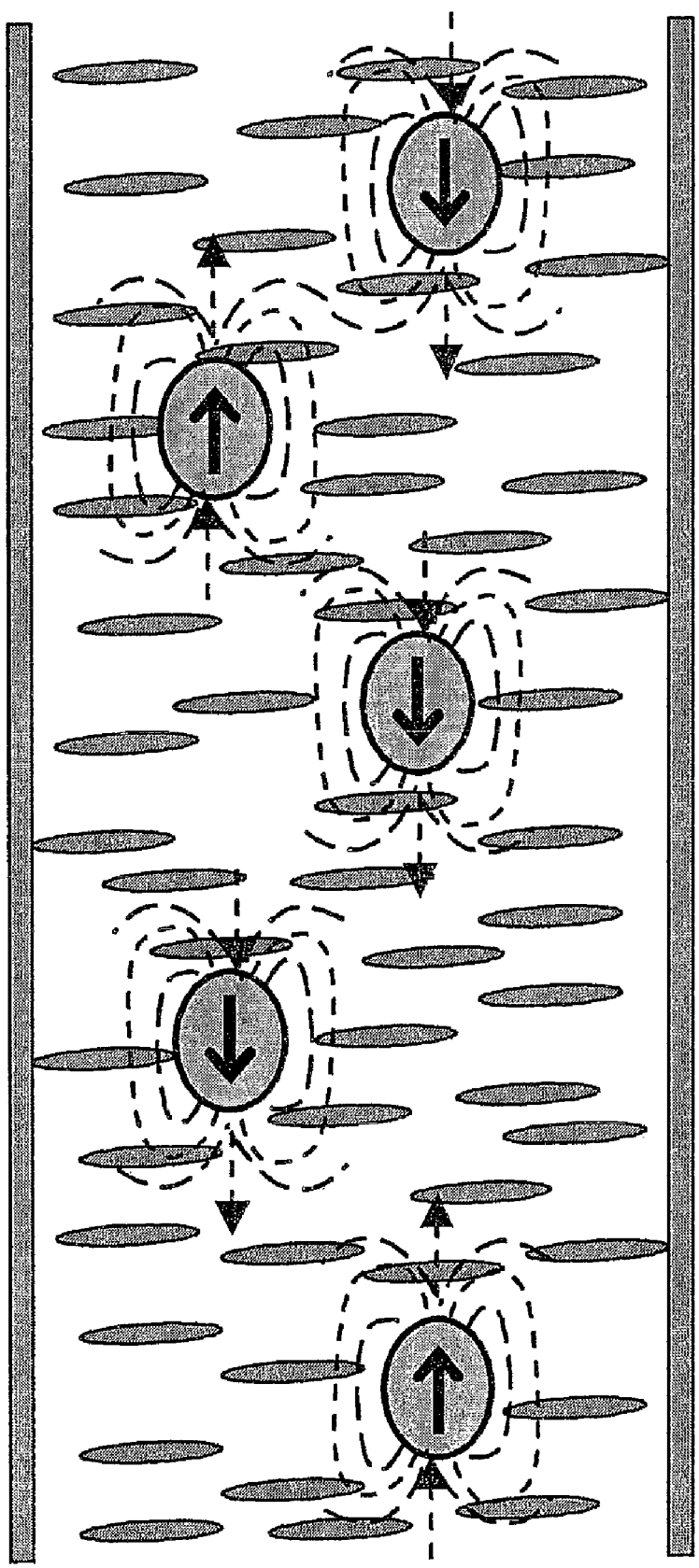
FIG. 3 is a schematic representation of a dispersion of ferroelectric particles in a nematic liquid crystal.

The detailed description of the preparation of ferroelectric nematic suspensions is described in the inventors above journal article. In short, small ferroelectric particles were obtained by milling larger particles ($\approx 1$ μm size in the case of $Sn_2P_2S_6$ material) or breaking aggregates of small particles into separate pieces (in the case of $BaTiO_3$ material). The resulting ferroelectric particles were mixed with a solution of oleic acid (surfactant) in heptane. The particles were ground in a planetary ball mill for 10 hours. The ferroelectric particle suspension obtained was mixed with a liquid crystal. The heptane was then evaporated and the mixture was ultrasonically dispersed for 5 min which homogeneously distributed the ferroelectric particles as schematically shown in FIG. 3. The relative concentrations of components were adjusted to give a final suspension with about 0.3% by weight of ferroelectric particles.

Planar or homeotropic cells were filled at an elevated temperature $T>T_c$ with a liquid crystal suspension or pure liquid crystal. The cells consisted of two ITO coated glass substrates with either a rubbed polyimide layer or a material providing vertical alignment. Calibrated spacers controlled cell spacing.

Figure 4:
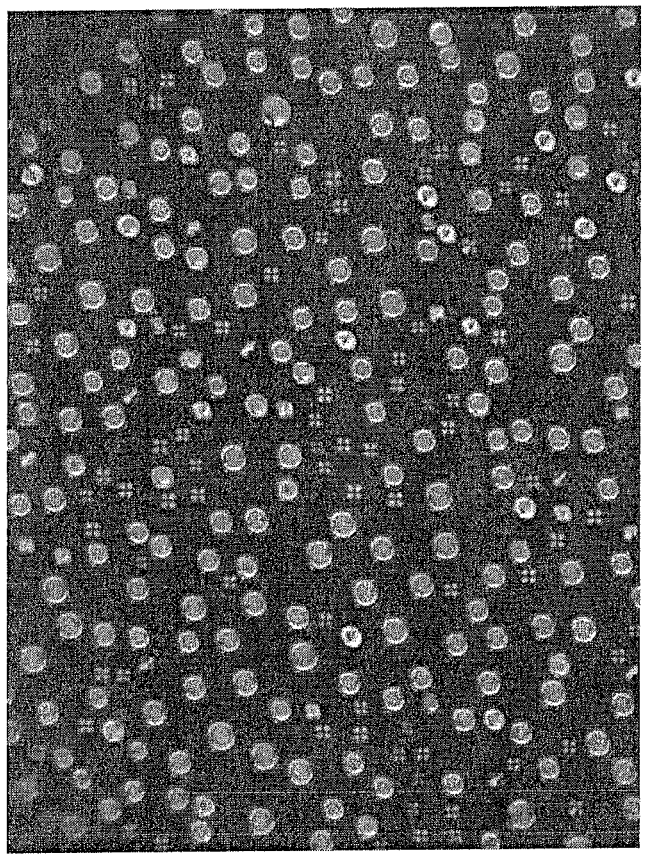
FIG. 4 are optical polarizing microscope pictures of the nematic-isotropic transition for a) pure negative nematic mixture NLC1 with the transition temperature of 83° C. and b) for the same liquid crystal mixed with $BaTiO_3$ ferroelectric particles—the picture is taken at 97° C.
Figure 4:
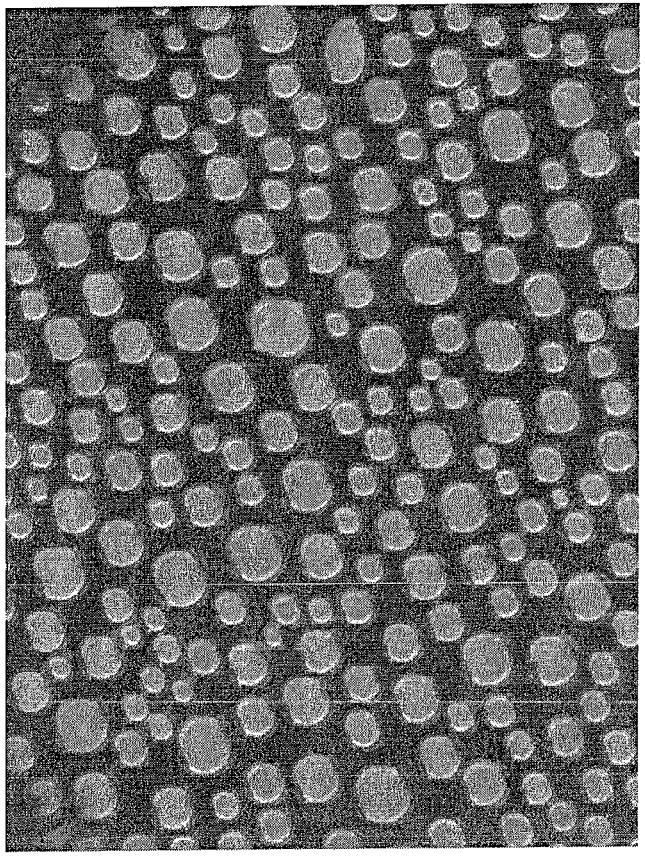

Influence of the Ferroelectric Particles on the Physical Characteristics of Liquid Crystals Shift of the Phase Transition Points FIG. 4 shows optical polarizing microscope pictures of the nematic-isotropic transition for the pure negative nematic mixture NLC1 with the transition temperature of 83° C. (FIG. 4, a) and for the same liquid crystal, mixed with $BaTiO_3$ ferroelectric particles (FIG. 4, b). This simple experiment shows that the ferroelectric particles increase the phase transition temperature from 83° C. to 97° C.

Figure 5:
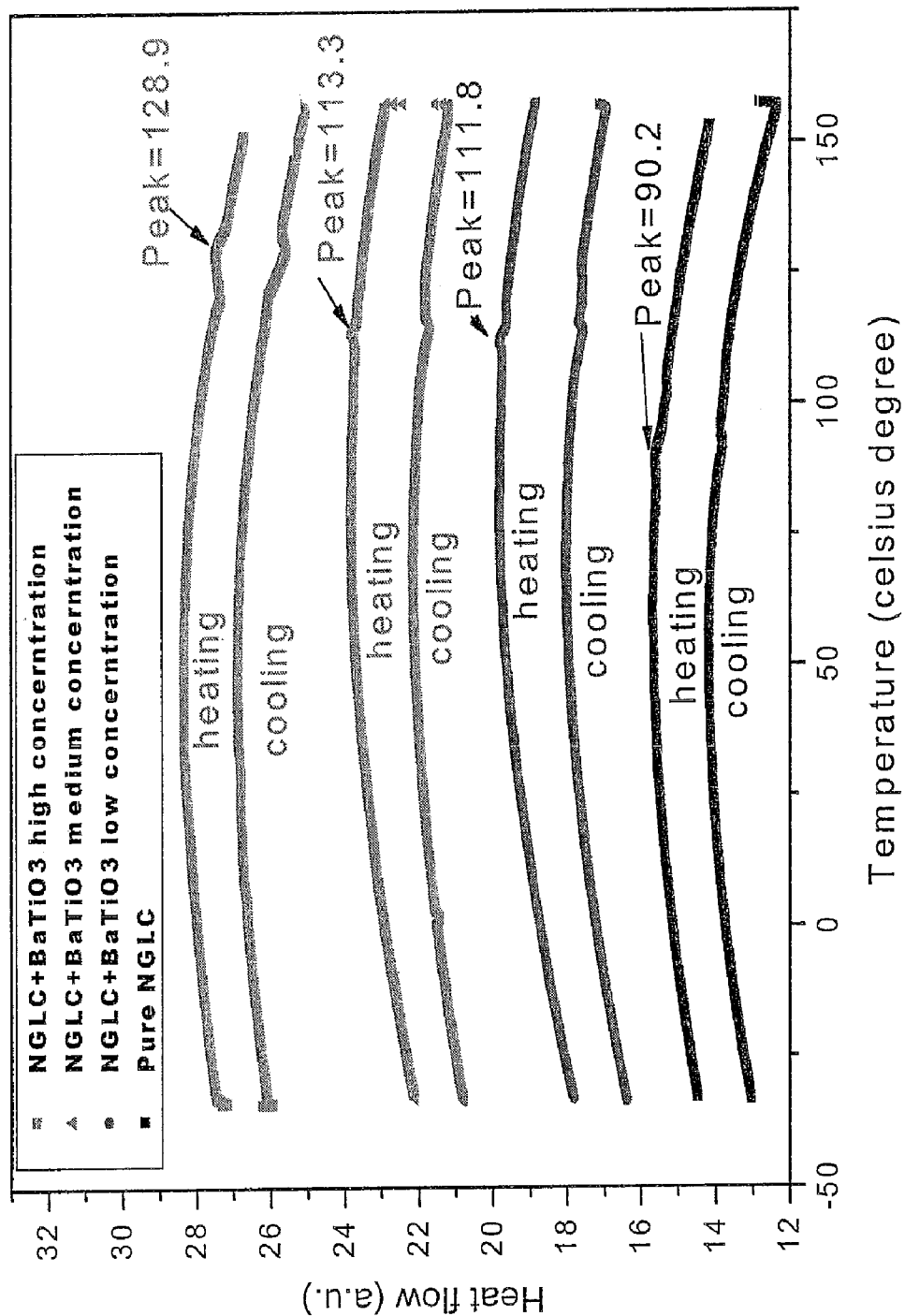
FIG. 5 are DSC results on the nematic-isotropic transition points for the pure negative mixture NLC2 and suspensions of this liquid crystal with different concentration of the $BaTiO_3$ ferroelectric particles.

To confirm that ferroelectric particles can affect the phase transition temperature ($T_{NI}$) we considered another negative liquid crystal mixture NLC2. We measured the phase transition points of the pure liquid crystal and the corresponding suspension with differential scanning spectroscopy. FIG. 5 are DSC results on the nematic-isotropic transition points for the pure negative mixture NLC2 and suspensions of this liquid crystal with different concentration of the $BaTiO_3$ ferroelectric particles, and shows that for the liquid crystal NLC2 the phase transition temperature is 90.2° C. The transition temperature increases as the concentration of the particles increases: first till 111.8° C., then to 113.3° C., and finally 128.9° C. for higher concentrations.

Figure 6:
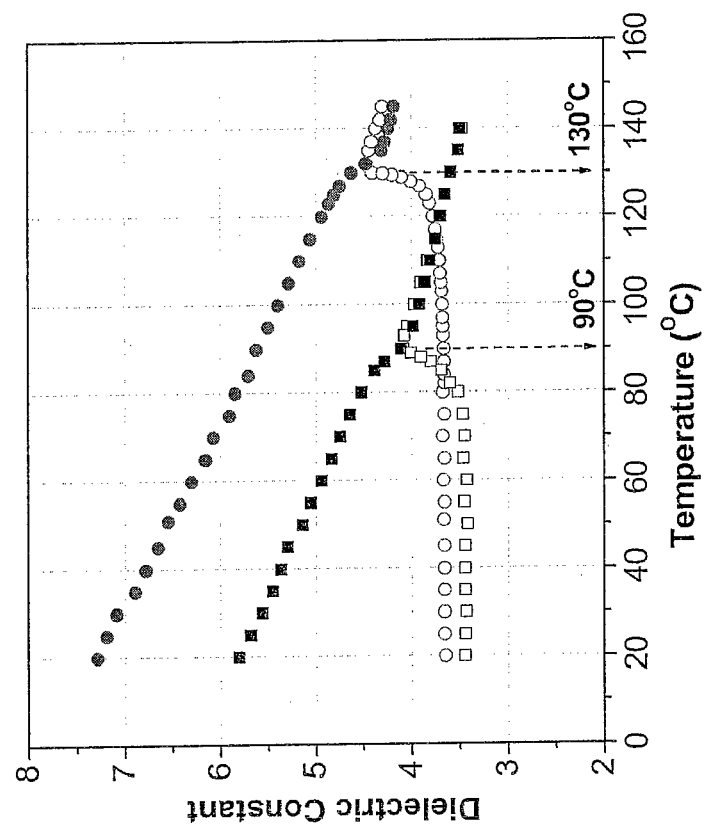
FIG. 6 shows the dependence of the effective dielectric constant $\varepsilon^{\mathit{eff}}$ on temperature: a) for a commercial negative active matrix liquid crystal mixture NLC1 and a ferroelectric particles/liquid crystal suspension based on it; b) for a commercial negative active matrix liquid crystal mixture NLC2 and a ferroelectric particles/liquid crystal suspension based on it.
Figure 6:
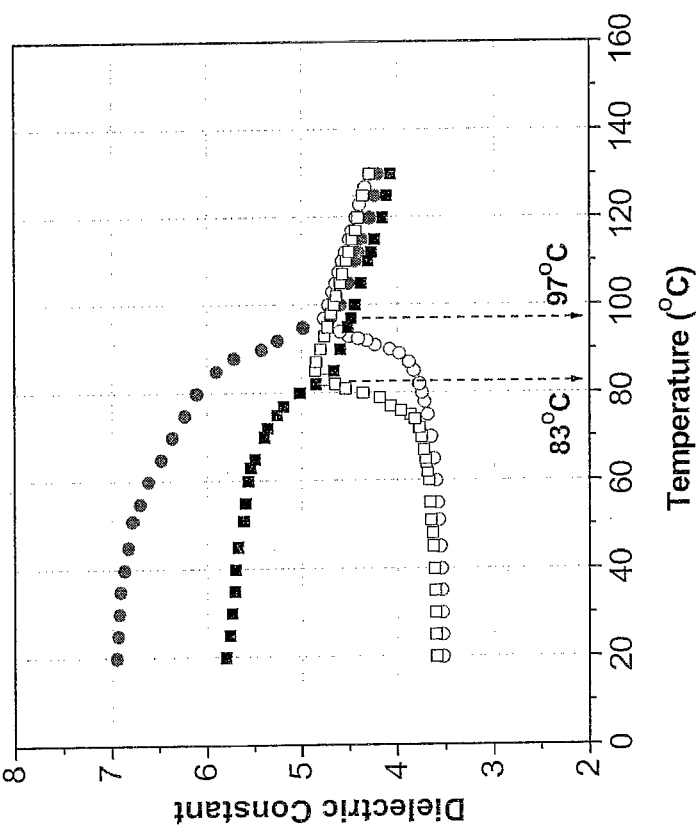

Finally, we checked these two results, measuring the change of the dielectric constants of the liquid crystals NLC1 and NLC2 and their mixtures with BaTiO3 particles as a function of temperature (FIG. 6). This last experiment confirms the data shown in FIG. 4 and FIG. 5. The dielectric anisotropy for the NLC1 based ferroelectric suspension disappears at the temperature of 97° C., indicating the same transition point as was determined by optical observations:

14° C. higher then for the NLC1 liquid crystal. The dielectric anisotropy for the NLC2 based ferroelectric suspension disappears at the temperature of 130° C., while for the NLC2 liquid crystal it disappears at the temperature of 90° C. Again, these results are very close to those obtained by the method of DSC.

These sets of experiments demonstrate that ferroelectric particles doped in a liquid crystal, can lead to a significant increase of the phase transition temperatures.

Change of Dielectric Constants and Increase of Dielectric an Isotropy

To demonstrate that the suspended ferroelectric particles are coupled with the liquid crystal we measured the effective dielectric constant of the mixture. We assume that the liquid crystal matrix and the particles are both dielectrically anisotropic and both rotate in an applied electric field to minimize the total free energy. The resulting dielectric torques for the liquid crystal matrix and the particles are proportional to $\in_a^{LC} E_{ac}^2$ and $\in_a^{particle} E_{ac}^2$ respectively, where $\in_a$ is their dielectric anisotropy. Since $\in_a^{particles} \gg \in_a^{LC}$, the particles give the main contribution to the torque even at their low concentration. We assume that anchoring aligns the liquid crystal with the particles. The suspension can therefore be characterized by an effective dielectric anisotropy $\in_a^{susp}$ that assumes that the particles act as a molecular additive. If the interaction between the particles is neglected, in the zero order approximation $\in_a^{susp}$ is equal to [16]:

$$\in_a^{susp} = (1-f_v)\in_a^{LC} + f_v \in_a^{particles} \quad (1)$$

($f_v$ is the volume fraction of the particles). The ferroelectric particles have a very high value of the dielectric anisotropy, about $\in_a^{particles} \approx 10^3$ (for the particles of $BaTiO_3$). Even at small concentrations of the particles, the total dielectric anisotropy of the mixture should be higher Spontaneous polarization of the ferroelectric particle also contributes to the increase of dielectric anisotropy. Indeed, in the case of the NLC-1 ($\in_a^{LC} \approx 2$) the suspension has a greatly enhanced dielectric anisotropy of $\in_a^{susp} \approx 3.5$ (FIG. 6a, the values of the dielectric constants at room temperature).

The same effect is observed for the liquid crystal NLC-2. The ferroelectric particles increased the dielectric anisotropy from ~2.3 for the pure liquid crystal till ~4 for the suspension (FIG. 6b).

Figure 7:
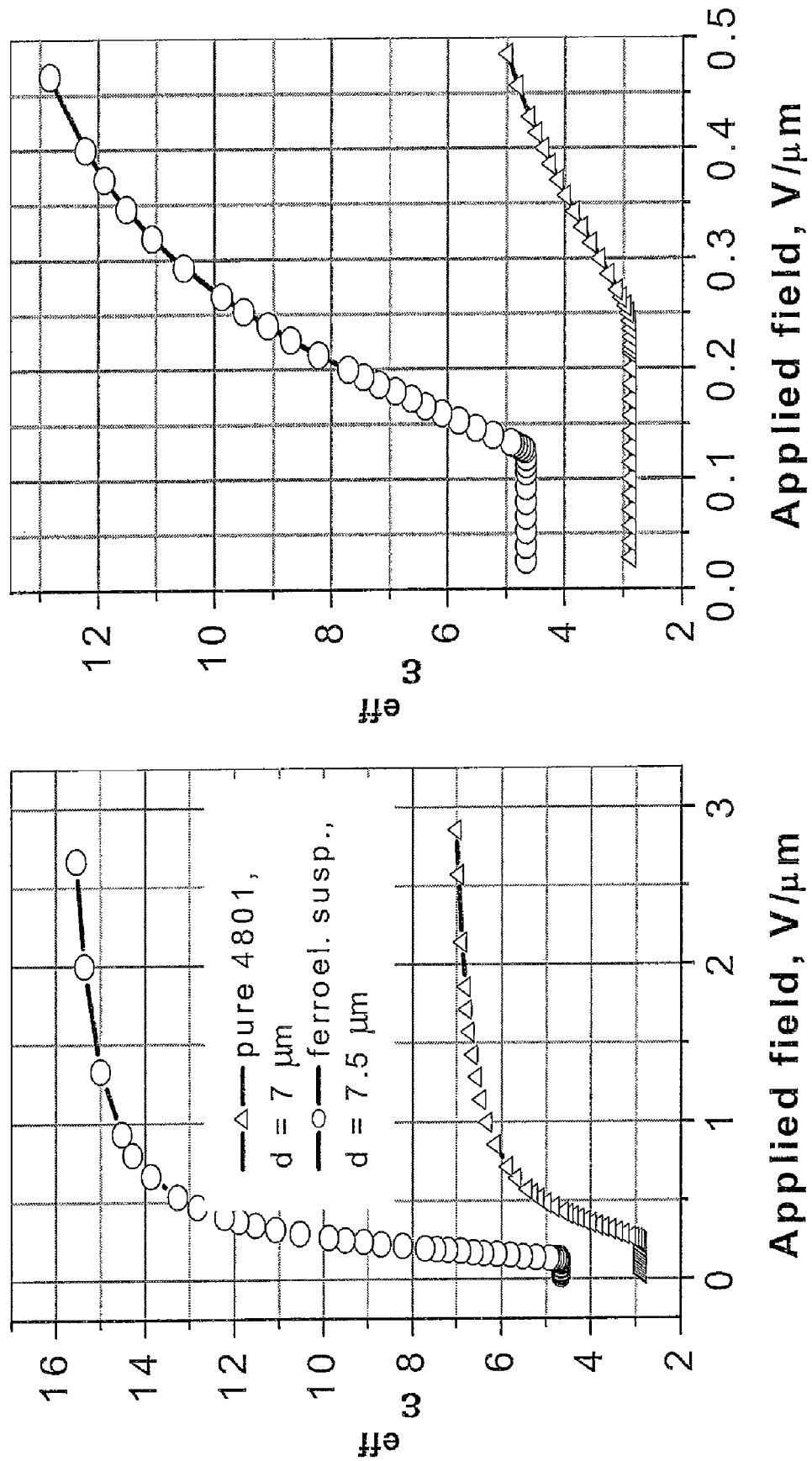
FIG. 7 shows the dependence of the effective dielectric constant $\in^{eff}$ on the applied field.

Similar effects were observed before in the case of $Sn_2P_2S_6$ ferroelectric particles mixed with ZLI-4801 liquid crystal. The dependence of the effective dielectric constant $\in^{eff}$ of the liquid crystal on the applied field is shown in FIG. 7. Below the Freedericksz transition, $V_{th}$, the director aligns with the pretilt angle of 1.5° on the surface and $\in^{eff} \approx \in_\perp$. At high enough voltages the liquid crystal aligns with the field and $\in^{eff} \approx \in_\parallel$. The threshold voltage of the Freedericksz transition for the suspension is $V_{th}^{susp}=0.91V$ just half that for the pure liquid crystal, $V_{th}^{LC}=1.87V$. This difference in the threshold can be estimated by the expression for the Freedericksz transition:

$$V_{th} \propto \sqrt{K/\in_a} \quad (2)$$

Because the tilt angle and elastic constants are the same for both cells, the difference in the threshold is totally the result of differences in the dielectric anisotropy and therefore:

$$V_{th}^{LC}/V_{th}^{susp} \approx \sqrt{\in_a^{susp}/\in_a^{LC}} \quad (3)$$

From FIG. 2 one can see that $\in_\parallel^{LC} \approx 7$, $\in_\parallel^{susp} \approx 15.7$, $\in_\perp^{LC} \approx 3$ and $\in_\perp^{susp} \approx 4.6$. This means that $V_{th}^{LC}/V_{th}^{susp} \approx 1.7$, which is close to the experimental values $V_{th}^{LC}/V_{th}^{susp}=1.9$. From the experimental data $\in_\perp^{susp}$ and formula (1) one can estimate the value of dielectric anisotropy of the particles $\in_a^{particles} \approx 2400$. This value is in the range of the report values of $\in_a^{particles}$ for $Sn_2P_2S_6$.

Figure 8:
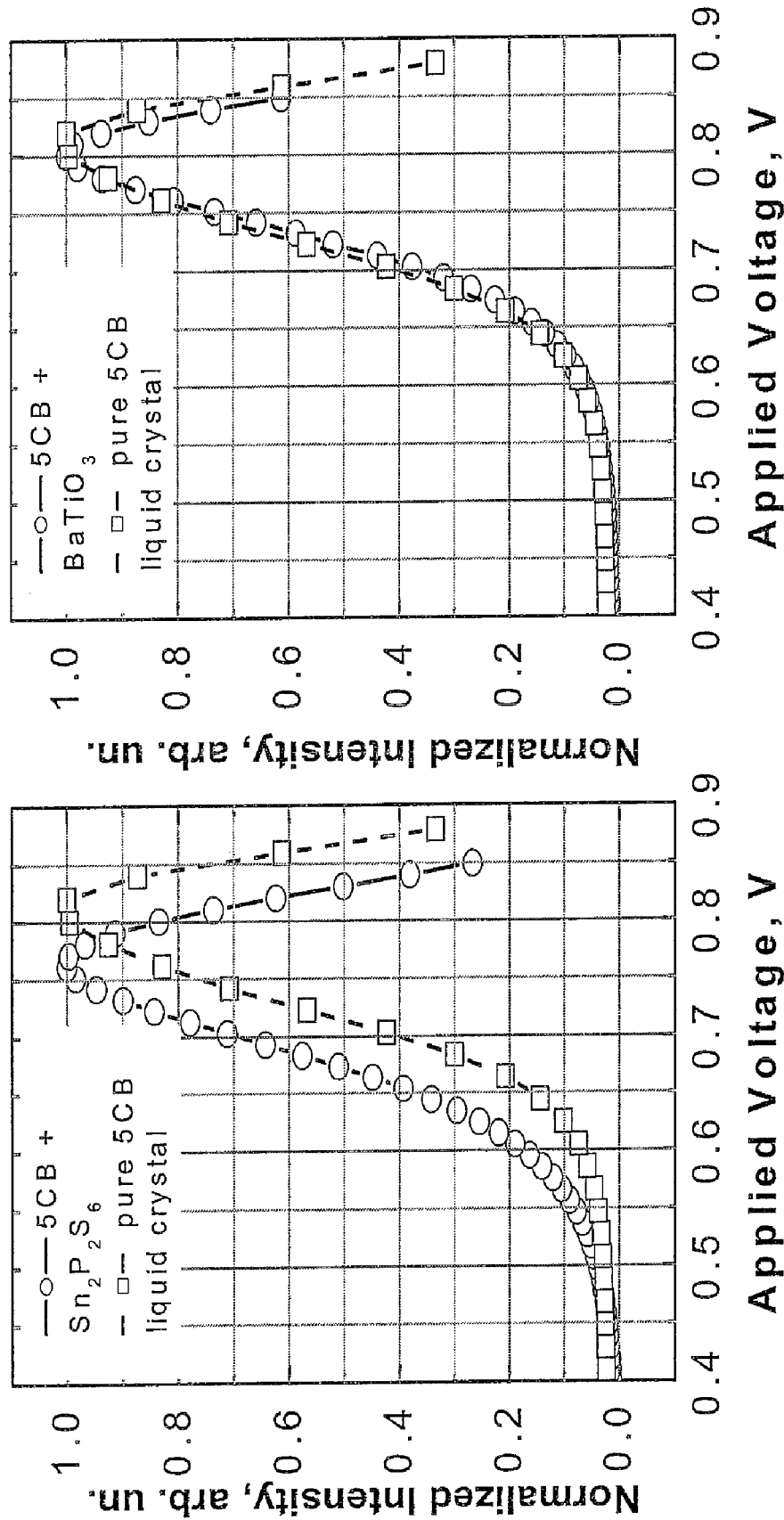
FIG. 8 shows the electro-optic response to the applied voltage for the pure 5CB liquid crystal cell and the cell filled with the mixture of the 5CB and 1.0 wt. % of $Sn_2P_2S_6$ ferroelectric nanoparticles and the 5CB and $BaTiO_3$ particles.

FIG. 8a is the electro-optic response to the applied voltage, and shows the Freedericksz transition voltage of a 5CB liquid crystal suspension of $Sn_2P_2S_6$ ferroelectric nanoparticles is lower than that of the pure 5CB liquid crystal cell by about 10%, as expected for the higher dielectric anisotropy liquid crystals. No decrease of the Freedericksz transition voltage was found when $BaTiO_3$ ferroelectric particles were used, either with 5CB liquid crystal (FIG. 8b), or with ZLI-4801. It suggests that specific particles needed to be found for each liquid crystal to create a necessary match between the liquid crystal and the particles so that the combined properties reveal in a full scale.

This set of experiments demonstrates that the ferroelectric particles share their dielectric properties with the liquid crystal by increasing the dielectric anisotropy of the host liquid crystal.

Increase of Birefringence

Figure 9:
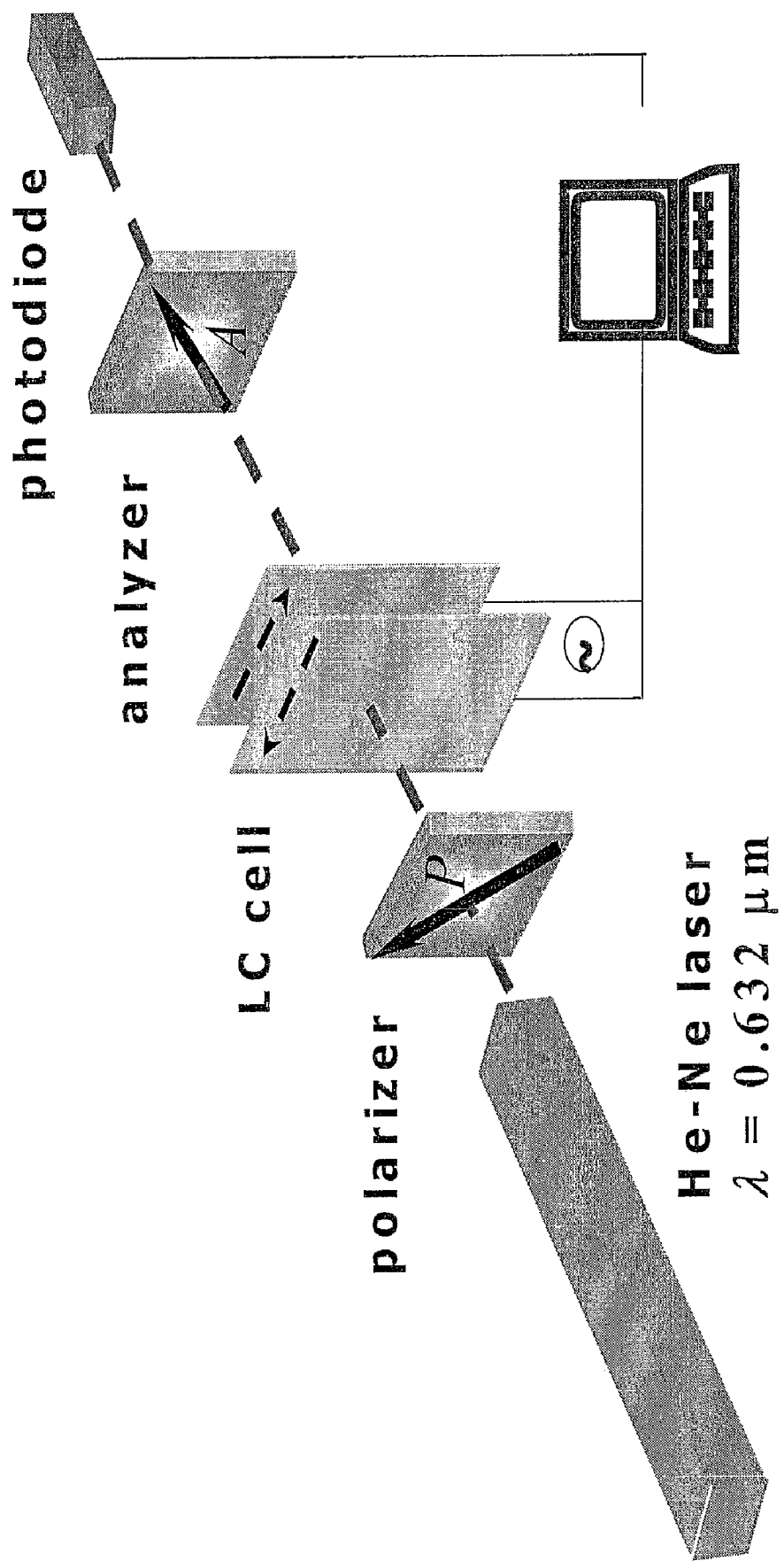
FIG. 9 is an experimental setup for measurement of electro-optic characteristics.

The dependence of transmitted light intensity at $\lambda=0.632$ μm passing through an initially planar or homeotropic cell placed between two crossed polarizers was measured, with the optical axis oriented 45° to the polarization axes using the set-up of FIG. 9. The transmitted intensity, I, of the normally incident beam can be calculated by the following equation: $I=I_o \sin^2(\delta/2)$, where $\delta=2\pi\Delta n d/\lambda$ is the angular phase retardation, where $\Delta n$ is a function of the applied voltage. The transmitted intensity will be at a minimum when the phase retardation, $\Delta nd$, is an even multiple of the incident light wavelength. The change of phase retardation of the cell can therefore be determined from a graph of the transmitted intensity relative to the applied voltage.

Figure 10:
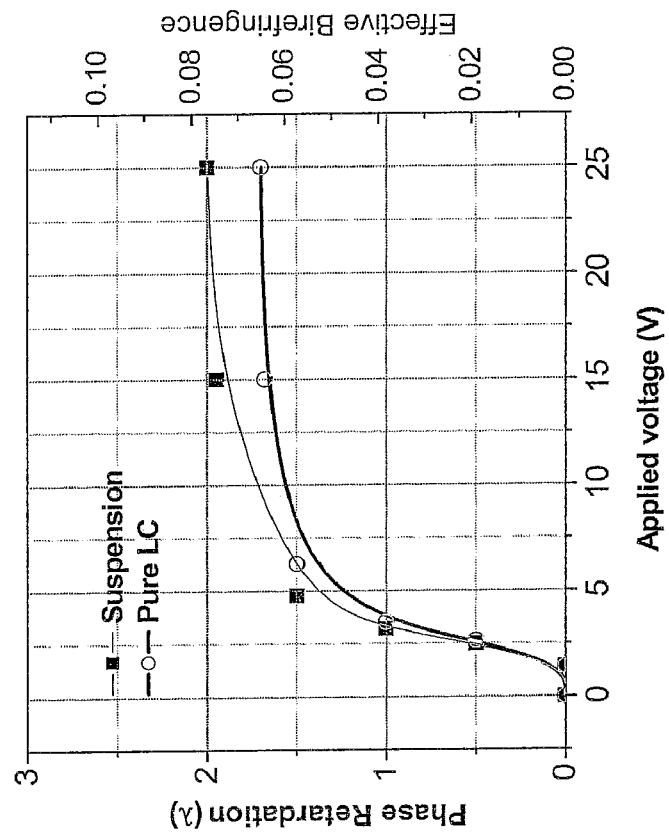
FIG. 10 shows the electro-optic response of the liquid crystal NLC-1 and a ferroelectric particles/liquid crystal suspension based on it.
Figure 10:
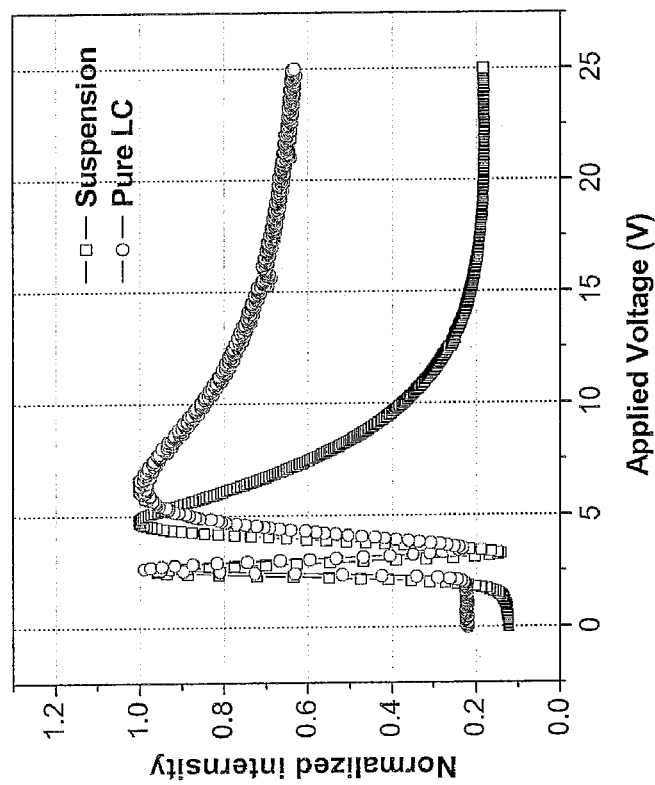

FIG. 10a shows the dependence I(U) for a cell filled with the pure liquid crystal NLC-1 and for the same cell filled with the NLC-1/$BaTiO_3$ suspension.

Figure 11:
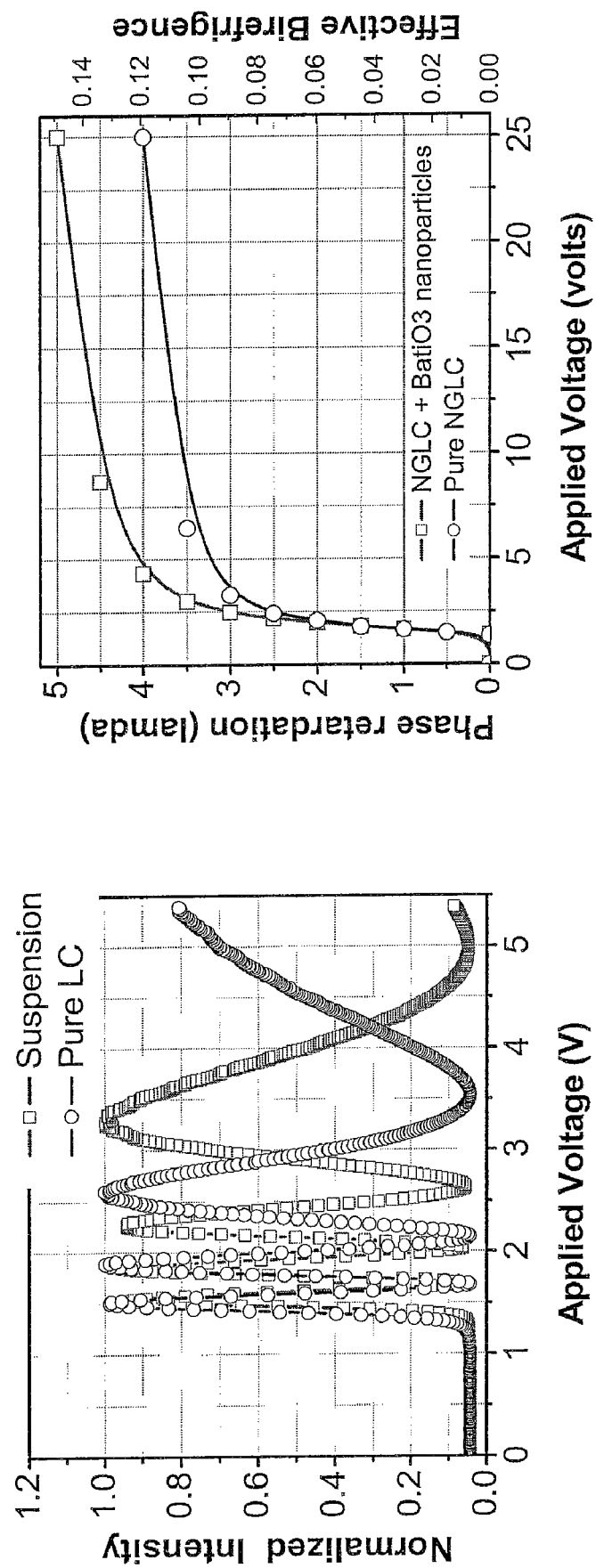
FIG. 11 shows the electro-optic response of the liquid crystal NLC-2 and a ferroelectric particles/liquid crystal suspension based on it.

FIG. 10b shows the corresponding phase retardation versus voltage change in terms of the wavelength $\lambda$. The graph shows that the effective phase retardation of the mixture is 0.078 compared to 0.065 for the pure NLC-1 liquid crystal. Total achievable phase retardation for the suspension is increased by 20% due to the increase of the effective birefringence $\Delta n_{eff}$. The same trend was observed for the NLC-2/$BaTiO_3$ suspension. FIG. 11 shows that the birefringence of the suspension is 0.138 in comparison with the 0.108 for the pure liquid crystal. Total achievable phase retardation for the suspension is increased by 25% due to the increase of the effective birefringence $\Delta n_{eff}$.

Figure 12:
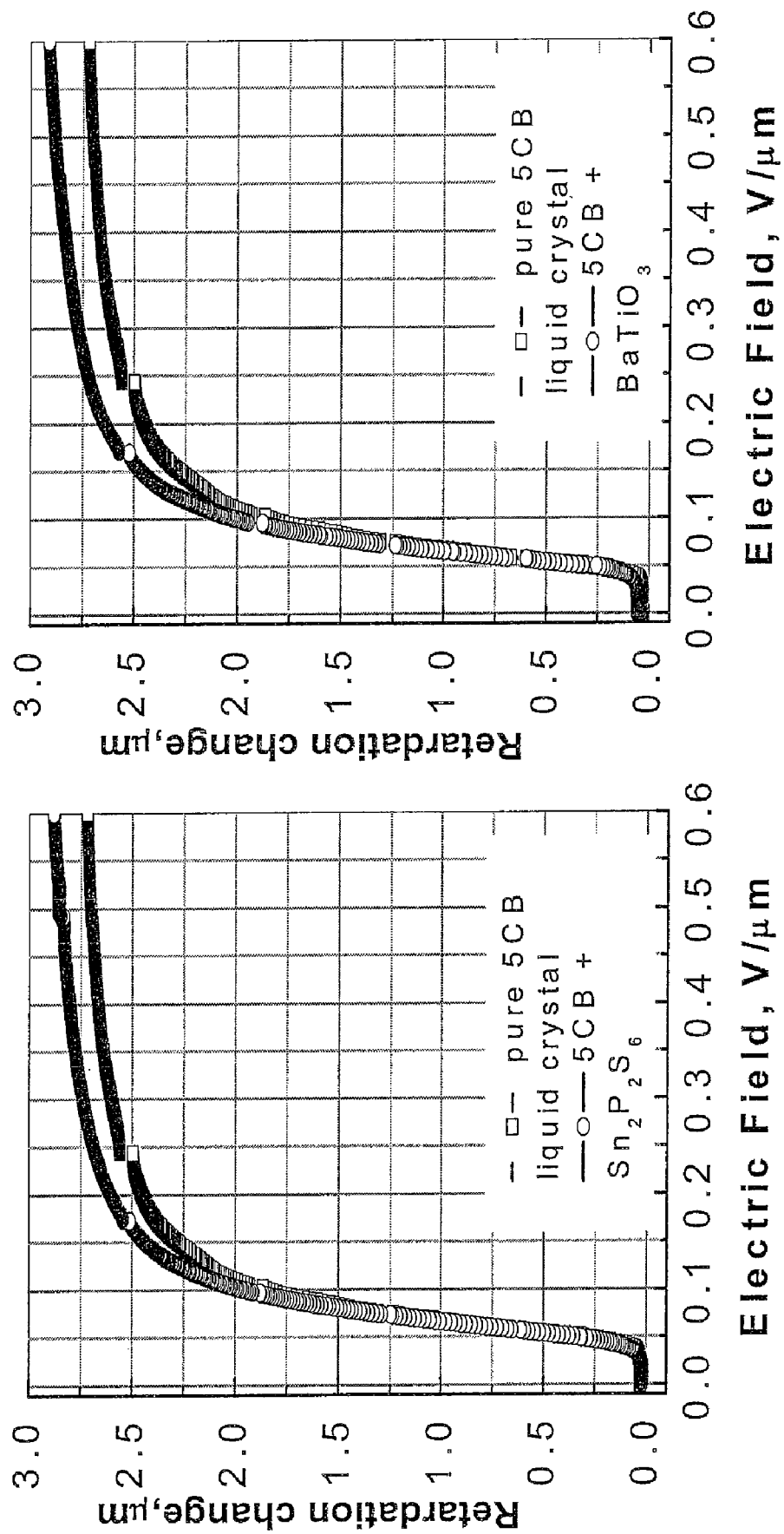
FIG. 12 shows the dependence of the change of the phase retardation on the applied electric field for the pure 5CB liquid crystal cell and cells filled with the mixture of the 5CB and 1.0 wt. % of $Sn_2P_2S_6$ ferroelectric nanoparticles and the 5CB and $BaTiO_3$ particles.

FIG. 12a shows the calculated dependence of the change of phase retardation as a function of applied voltage, $\Delta nd(U)$ for a cell filled with pure 5CB liquid crystal and for a cell filled with the mixture of 5CB and 1.0 wt. % of the $Sn_2P_2S_6$ ferroelectric nanoparticles. The achievable phase retardation change for the ferroelectric particles/nematic suspension is larger than that for the pure 5CB liquid crystal. For example 9V applied to the 16 μm thick 5 GB cell produces complete homeotropic alignment and a phase shift of 2.71 μm for the pure cell and a phase shift of 2.87 μm for the $Sn_2P_2S_6$ ferroelectric nanoparticles suspension. A similar increase in the total phase retardation shift when the 5CB liquid crystal was doped with $BaTiO_3$ particles (FIG. 12b) was found, without a reduction in the voltage required to produce a homeotropic alignment. This indicated that the $BaTiO_3$ particles increase the birefringence of the mixture while having no effect on the dielectric anisotropy.

To summarize, it was observed that ferroelectric particles, being doped into a liquid crystal, also influence the birefringence of the liquid crystal.

EXAMPLES

Example 1

Performance of a Ferroelectric Particle/Nematic Liquid Crystal Suspension in a TN Display Mode We tested a suspension of $Sn_2P_2S_6$ ferroelectric particles/ 5CB liquid crystal in a standard twist liquid crystal cell. The liquid crystal twist cell consisted of two glass substrates and a LC suspension disposed between the substrates. The facing surfaces of the substrates were covered with an indium tin oxide (ITO) transparent electrode. The electrodes were covered with rubbed alignment layers consisting of NISSAN 7792 polyimide from Nissan. A droplet of the suspension was put on one of the substrates and the second substrate was placed onto the first substrate. The substrates were separated by rigid 20 μm spacers and were oriented such that the rubbing directions of the polyimide layers were perpendicular to each other. The twist cell then was sealed with epoxy glue.

The electro-optic characteristics of the twist cell were measured by standard methods in the art (see, for example, Blinov and Chigrinov, Electrooptic Effects in Liquid Crystal Materials, Springer-Verlag, N.Y., 1994). The cell was put between crossed polarizers, and the directions of rubbing of the aligning layers were either parallel or perpendicular to the polarizer axes (normally black mode). An electric field (frequency, f=1 kH) was applied to the ITO-electrodes of the cell and the dependence of the transparency of the system, T, on the applied voltage, V, was measured. In addition, the change of the transmission after abrupt switching on and switching off of an electric field was measured.

Figure 13:
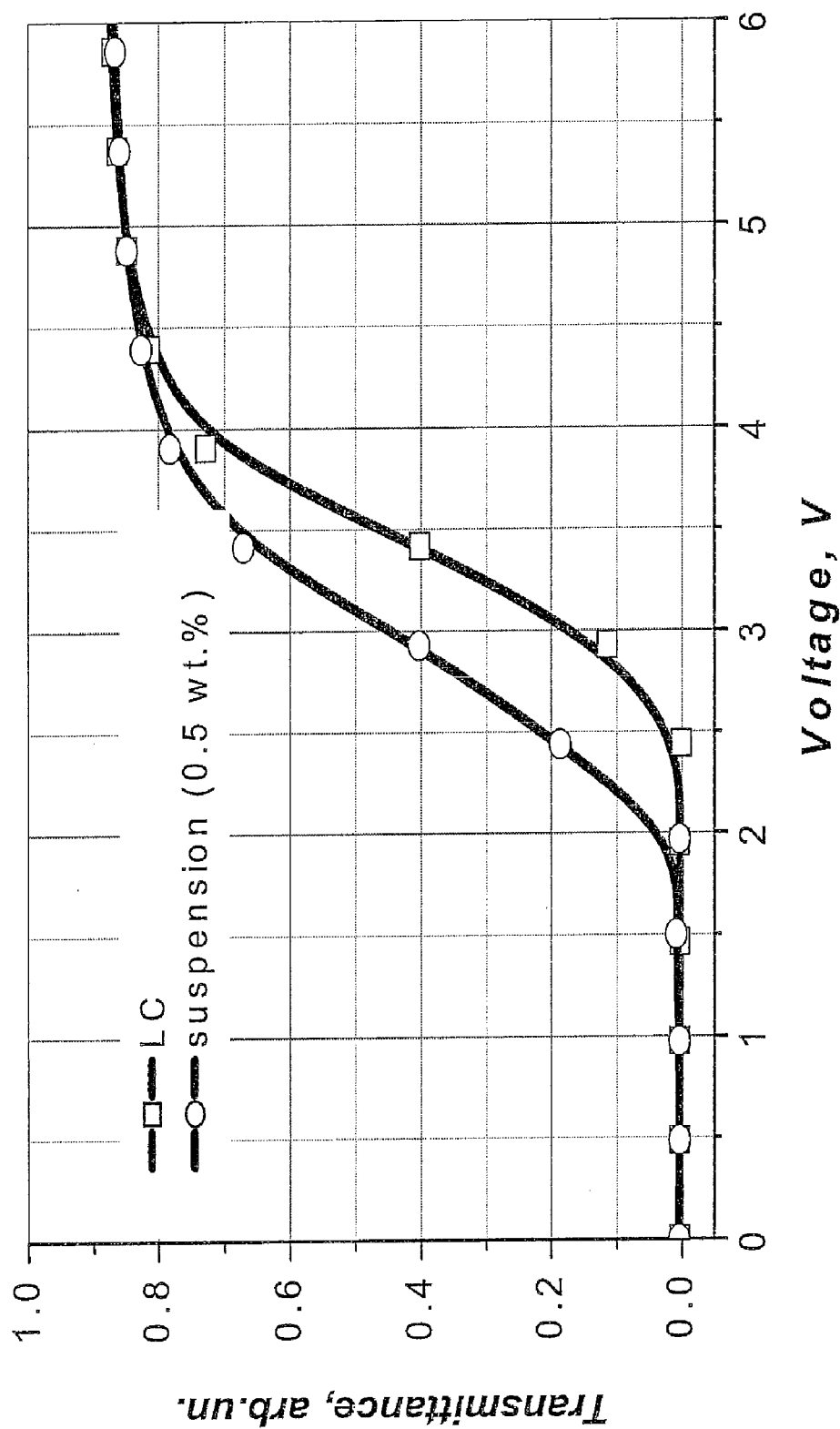
FIG. 13 shows the dependence of the transmission of the twist cell filled with ferroelectric LC K15 suspension and pure LC on the applied ac-voltage.
Figure 14:
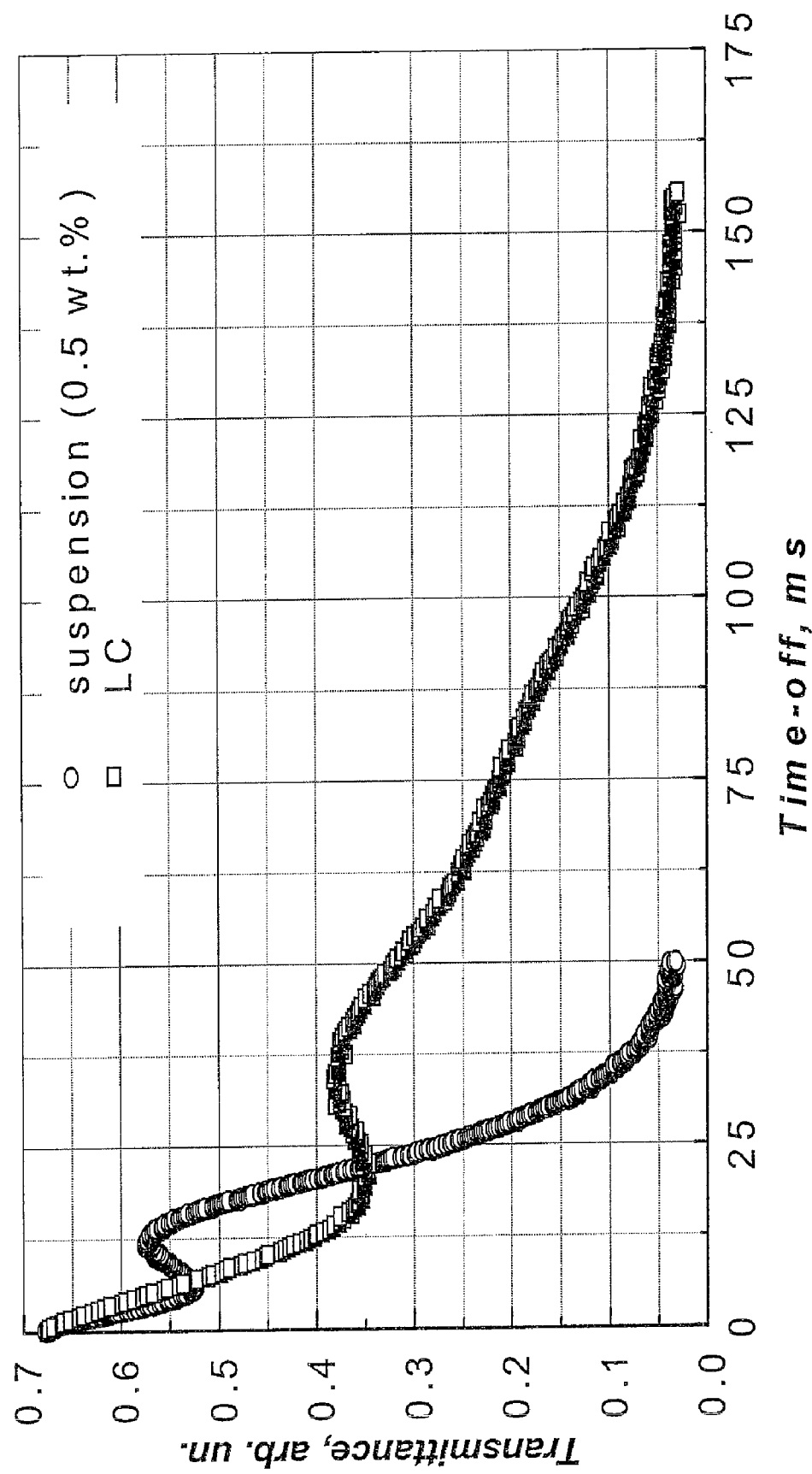
FIG. 14 shows the time-off characteristic the twist cell filled with ferroelectric LC K15 suspension and pure LC K15.
Figure 15:
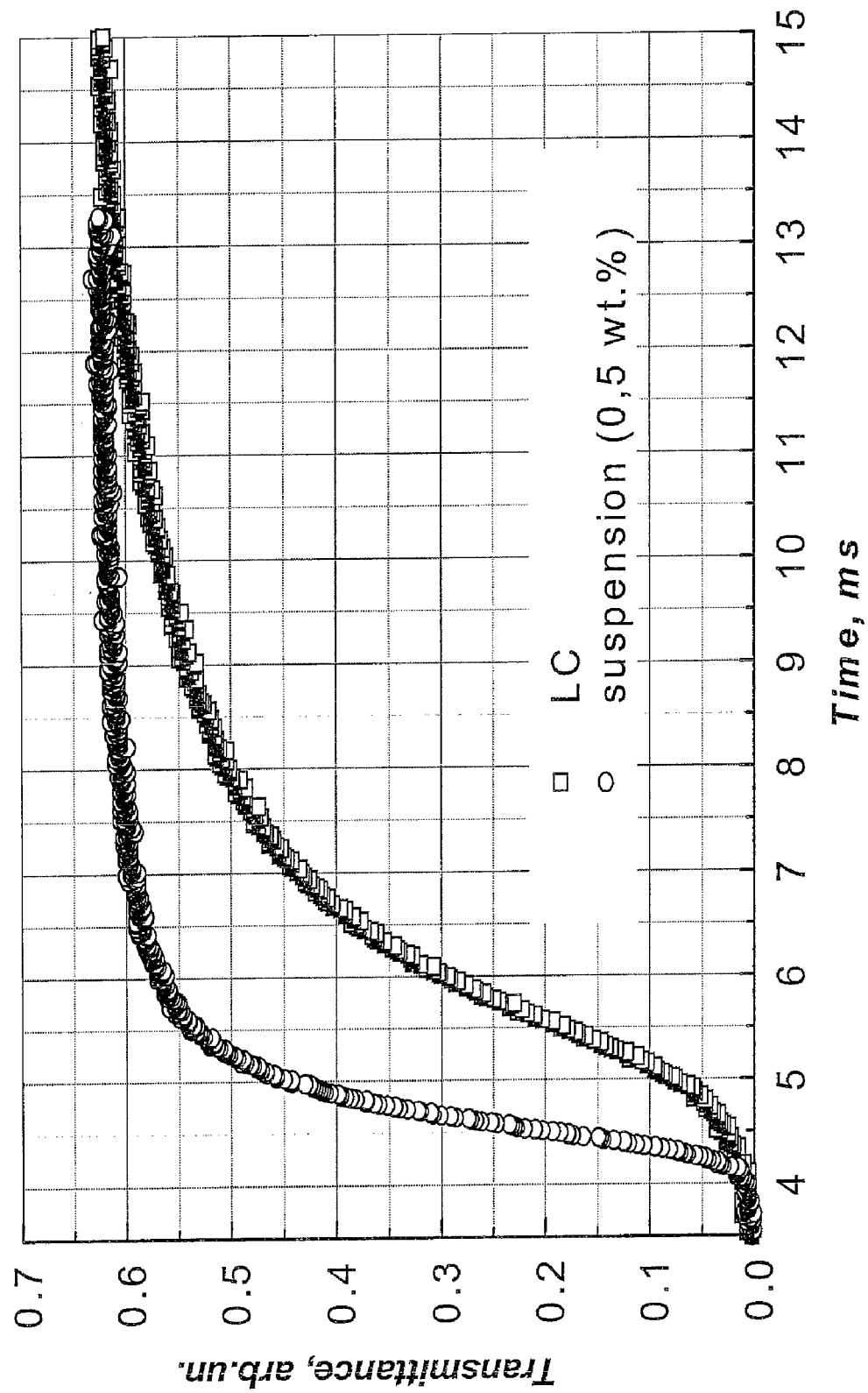
FIG. 15 shows the time-on characteristic the twist cell filled with ferroelectric LC K15 suspension and pure LC K15.

The results for the ferroelectric particle/liquid crystal suspension and an identical cell filled with pure liquid crystal are presented in FIGS. 13-15. FIGS. 13-15 show that doping the liquid crystal with ferroelectric particles lowers the driving voltage and reduces the response time of the liquid crystal cell. FIG. 13 shows that the threshold of the Freedericksz transition, $V_F$, defined as the voltage required to achieve 10% of the maximum transmittance ($T_{max}$) from a dark state decreases from 2.9 V to 2.2 V. As shown in FIG. 14, the decay time, defined as the time necessary to relax from $T_{max}$ to 10% of $T_{max}$, decreased from 140 ms to 40 ms. FIG. 15 shows that the rise time, that is, the time necessary to achieve 90% of $T_{max}$ from a dark state, decreased from 9.5 ms to 5.5 ms.

Example 2

Performance of a Ferroelectric Particles/Nematic Liquid Crystal in a Planar ECB Display Mode We obtained small ferro-electric $Sn_2P_2S_6$ particles by milling larger particles (about 1 μm size). The larger ferro-electric particles were mixed with a solution of oleic acid (surfactant) in heptane in a weight ratio of 1:2:10 respectively, ultrasonically dispersed and ground in a vibration mill. The resulting ferro-electric particle suspension was mixed with the liquid crystal. The heptane was then evaporated and the mixture was ultrasonically dispersed for 5 min. The relative concentrations of components were adjusted to give a final suspension with about 0.3% by volume of ferro-particles.

Planar cells were filled with the liquid crystal suspension or pure liquid crystal at a temperature (T) greater than the clearing temperature ($T_c$). The clearing temperature is the temperature at or above which the liquid crystal material enters an isotropic liquid state and becomes transparent. The cells consisted of two ITO coated glass substrates with a rubbed polyimide layer assembled for parallel alignment. Calibrated, rod-like 5 μm polymer spacers controlled cell spacing.

We compared the electro-optical response of the planar cell filled with the pure LC ZLI-4801 and a ferroelectric particle suspension with the same liquid crystal. The dependence of the effective dielectric constant $\in_{\mathit{eff}}$ of the liquid crystal on the applied field was discussed previously in the section of a general disclosure description and is shown in FIG. 7. It is shown that the threshold voltage of the Freedericksz transition for the suspension is about 0.91V, which is about half that for the pure liquid crystal, 1.87V.

Example 3

Stressed Liquid Crystals Based on a Ferro-Nematic

This example is related to the Stressed Liquid Crystal (SLC) materials. Stressed Liquid Crystals (SLCs) are new light modulating materials that decouple the thickness of the liquid crystal layer and the switching speed and providing large shifts of the phase retardation in very short times. The material consists of interconnected micro-domains of a liquid crystal dispersed in a stressed polymer structure. The stress deformation imposes unidirectional orientation of the liquid crystal. The new material is optically transparent and provides electrically controllable phase modulation of the incident light.

The performance of the SLCs is greatly enhanced by using a ferroelectric particles/nematic liquid crystal mixture rather than the pure liquid crystal for making the SLCs.

Large $Sn_2P_2S_6$ particles (~1 μm) were milled in a solution of oleic acid (surfactant) and heptane in a weight ratio of 1:2:10 respectively in a mill. The resulting ferro-electric particle suspension was mixed with the nematic liquid crystal 5CB. The heptane was then evaporated and the mixture was ultrasonically dispersed for 5 min. The relative concentrations of components were adjusted to give a final suspension with about 0.3% by volume of ferro-particles.

The ferroelectric liquid crystal suspension was mixed with the photopolymerizable monomer NOA65. The material was sandwiched between glass substrates that contain electrodes disposed on the facing surface of each of the substrates. The gap between the substrates was controlled using 22 μm plastic sphere spacers. The preparation of the films consisted of two steps. First, we irradiated the cell at the uniform temperatures of 60 0C. during 30 minutes with the UV light of the intensity of ~30 mW/cm². The cell was then irradiated at 25° C. another 30 minutes with the UV light of the same intensity. The first step created a very developed tiny polymer structure while the second step finishes the phase separation more effectively and strengthened the structure created in the first step. To clarify a role of the ferroelectric particles in the ferronematic based stressed liquid crystal we prepared another cell but using the 5CB liquid crystal.

Figure 16:
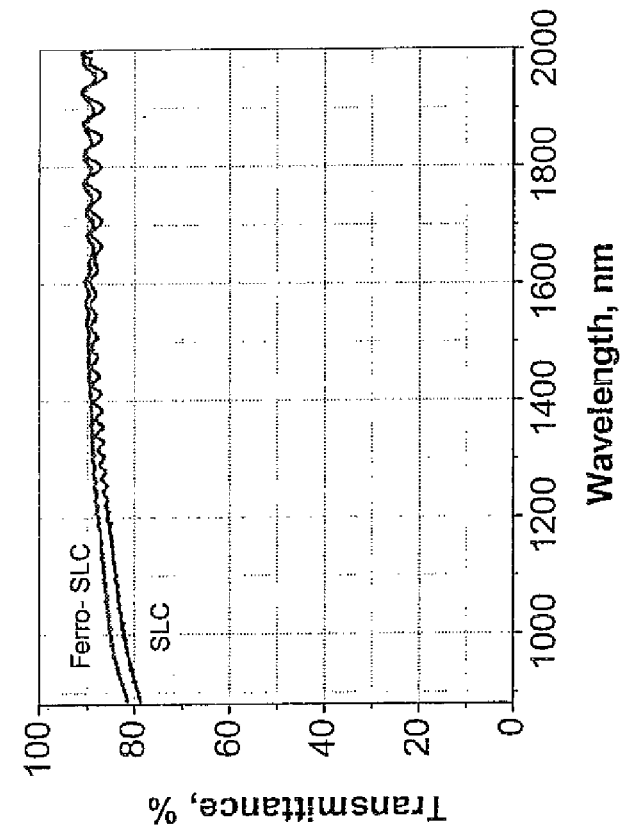
FIG. 16 shows the effect on transmission of adding ferroelectric particles to stressed liquid crystals.
Figure 16:
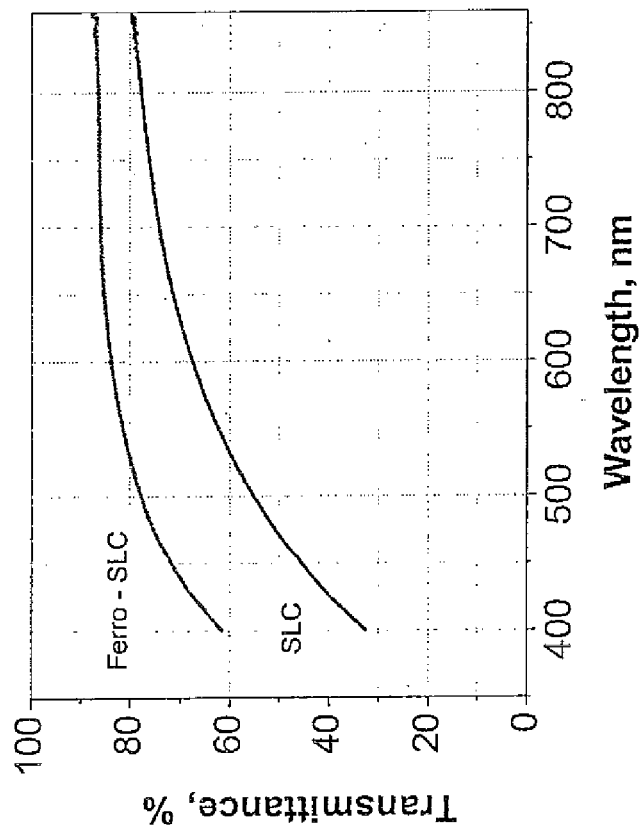

It was found that after application of equal shearing deformations to the both cells, the ferro-SLC cell is much more transparent than the SLC cell. FIG. 16a shows the transmittance spectra of the SLC and the ferro-SLC films in visible. The transmittance of the ferro-SLC is 10% greater at the wavelength of 860 nm and the difference increases at shorter wavelengths, achieving about 30% at the wavelength of 400 nm. As expected the difference in the cells' transmittance is small in the IR (FIG. 16b). The decrease of the residual scattering in the SLC films with the presence of ferroelectric particles may be explained by better ordering of the liquid crystal domains or by higher order parameter value of the mixture compared to the order parameter of the pure 5CB.

Figure 17:
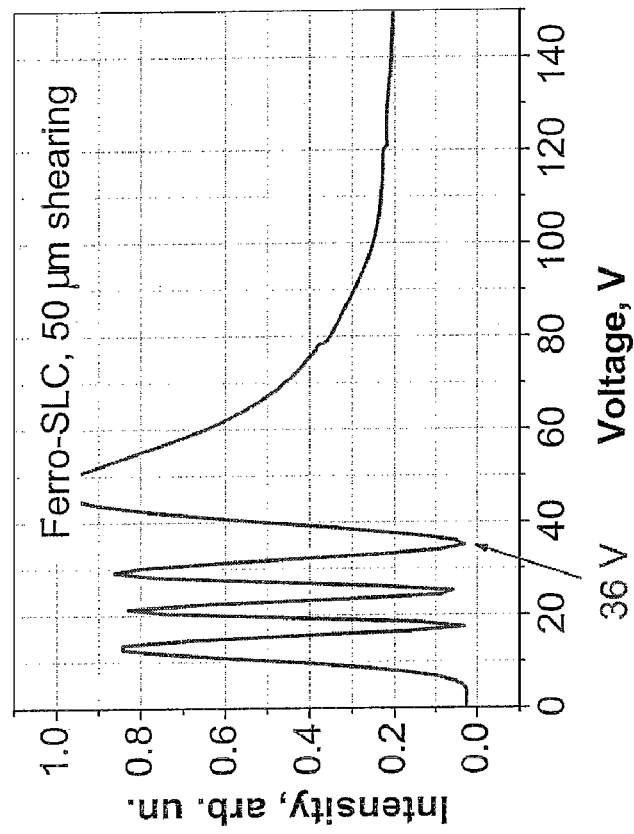
FIG. 17 shows the effect of ferroparticles on the reduction of driving voltage of the stressed liquid crystals.
Figure 17:
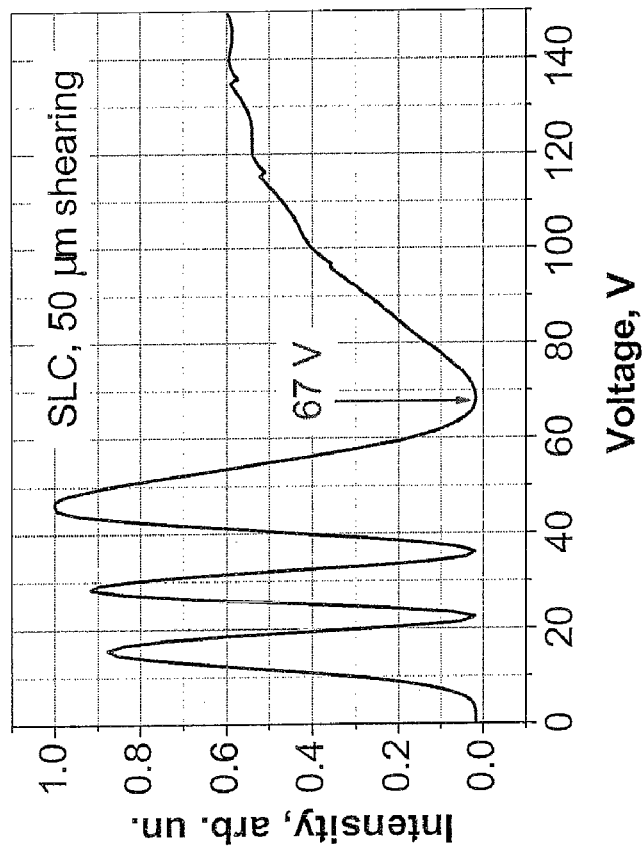

FIG. 17 shows dependence of the phase retardation as a function of an applied voltage in transmittance mode for the SLC and the ferro-SLC films, respectively, when the shearing distance is 50 μm. The variation of the transmitted light intensity between two successive minima demonstrates the switch of the phase retardation equal to the wavelength of the probing light, λ=0.632 μm, or (=2 (in terms of the angular phase retardation. FIG. 17a shows that to produce the phase shift of 3( (1.9 (m the SLC cell requires about 68 V while to produce the same phase shift the ferro-SLC cell requires only 36V what is almost 2 times less (FIG. 17b). This confirms that the decrease of the driving voltage for the ferro-SLC films is due to the enhanced dielectric anisotropy of the liquid crystal used, which in turn is due to the presence of the ferroelectric particles in the liquid crystal material used.

Counting the total number of maxima that can be produced by each of the cells (FIG. 17), we conclude that the total shift of the phase retardation is higher for the ferro-SLC cell than for the SLC cell; 150 V applied to the SLC cell switches 2.2 (m of the phase retardation while the same voltage applied to the ferro-SLC cell switches 2.9 (m. The thickness of both cells has the same value. This means that the observed changes of the achievable phase shift are due to the increase of the birefringence of the liquid crystal material used.

This enhancement can be quantified from one more point of view. The expected maximum shift of the phase retardation is (nd(1−c)=3.78 μm, where (n=0.191 birefringence of the 5CB liquid crystal, d=22 μm thickness of the cells, c=0.1 concentration of the polymer. If the efficiency of the phase separation is determined as a ratio of the expected maximum shift of the phase retardation to those values obtained experimentally, the efficiency of the phase separation is about 58% for the SLC material and about 77% for the ferro-SLC.

Figure 18A:
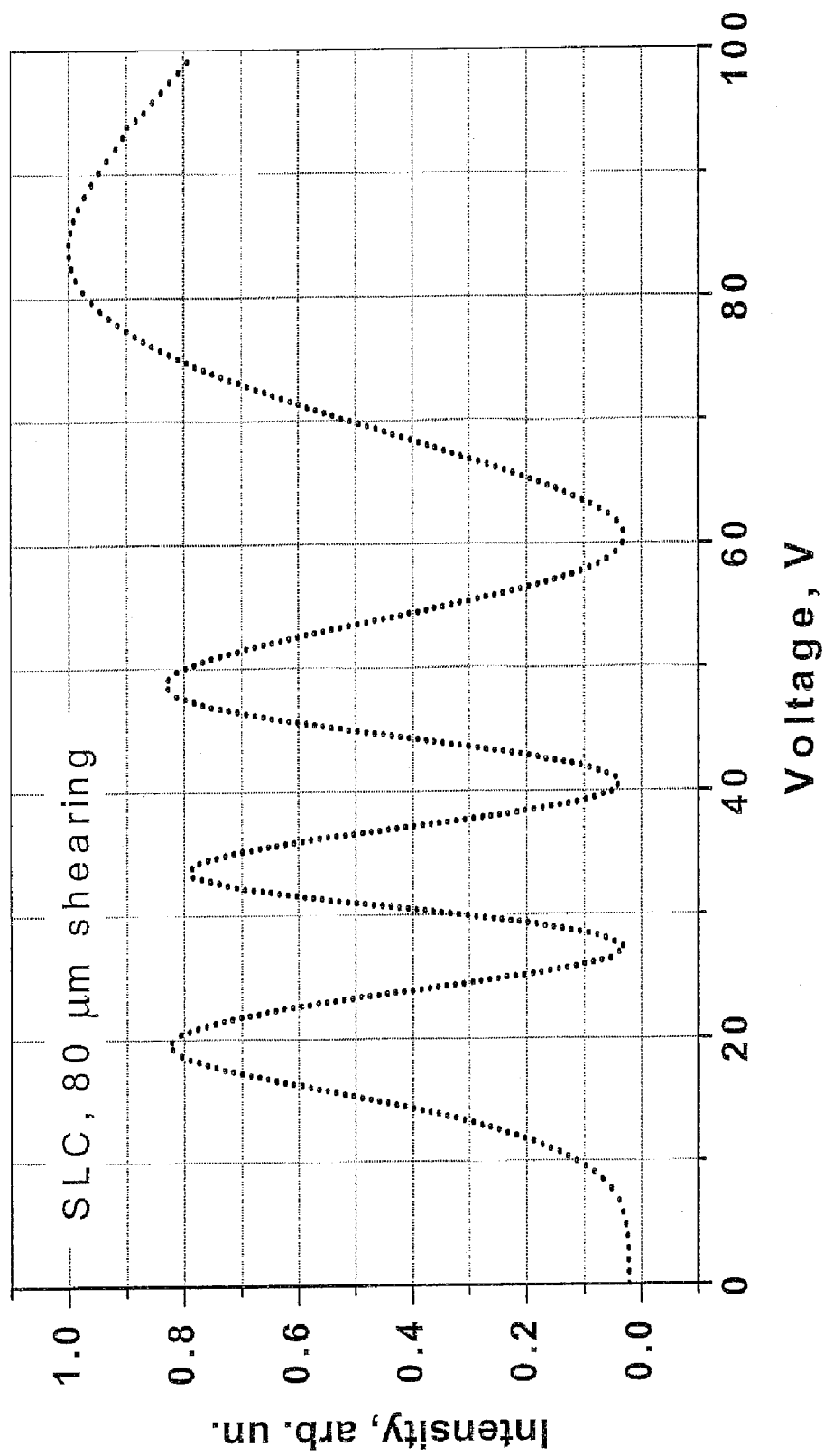
FIG. 18a shows the dependence of the transmittance of the SLC cell vs applied voltage measured between two crossed polarizers at $\lambda=0.632$ μm.
Figure 18B:
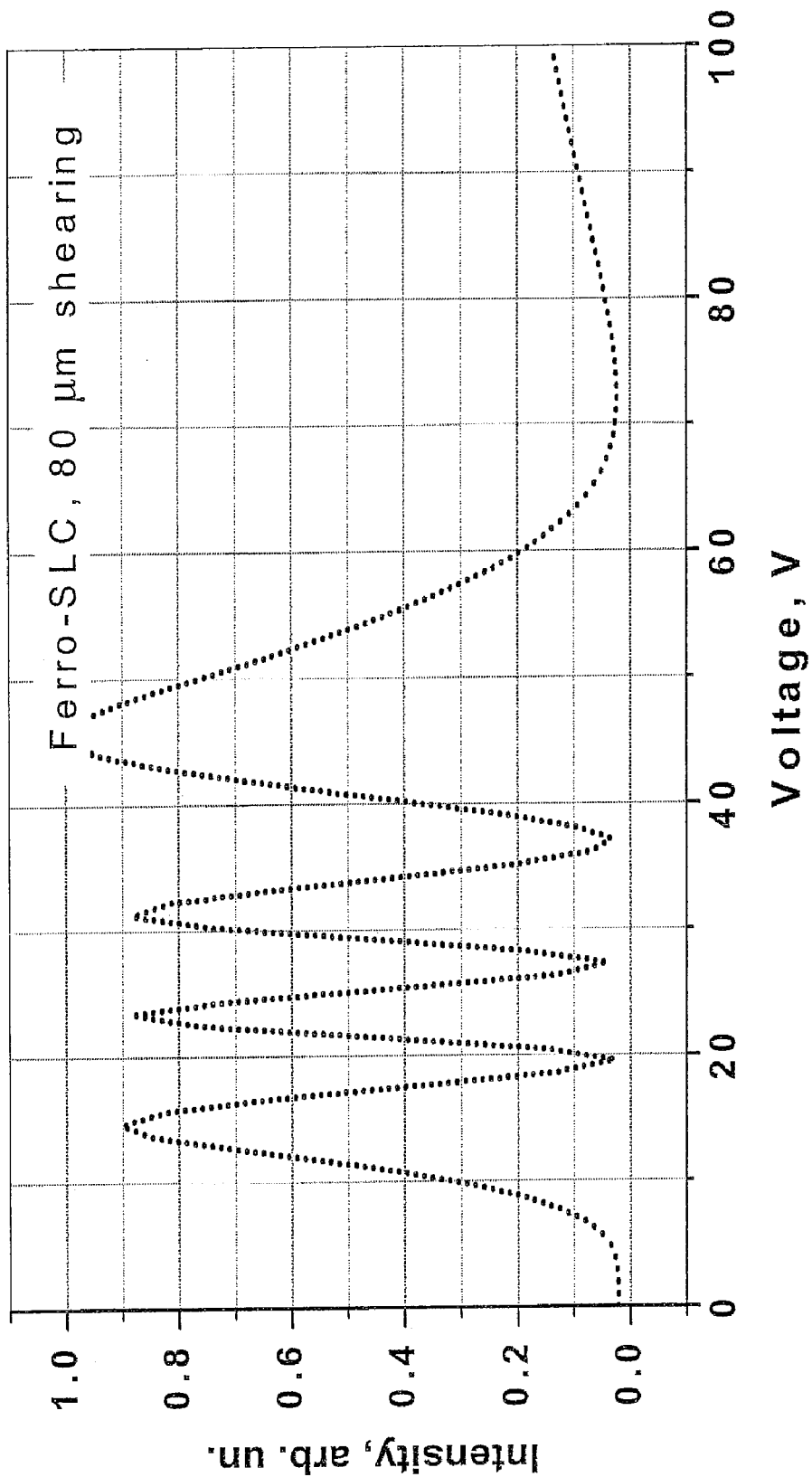
FIG. 18b shows the dependence of the transmittance of the ferro-SLC cell vs applied voltage measured between two crossed polarizers at $\lambda=0.632$ μm.
Figure 19A:
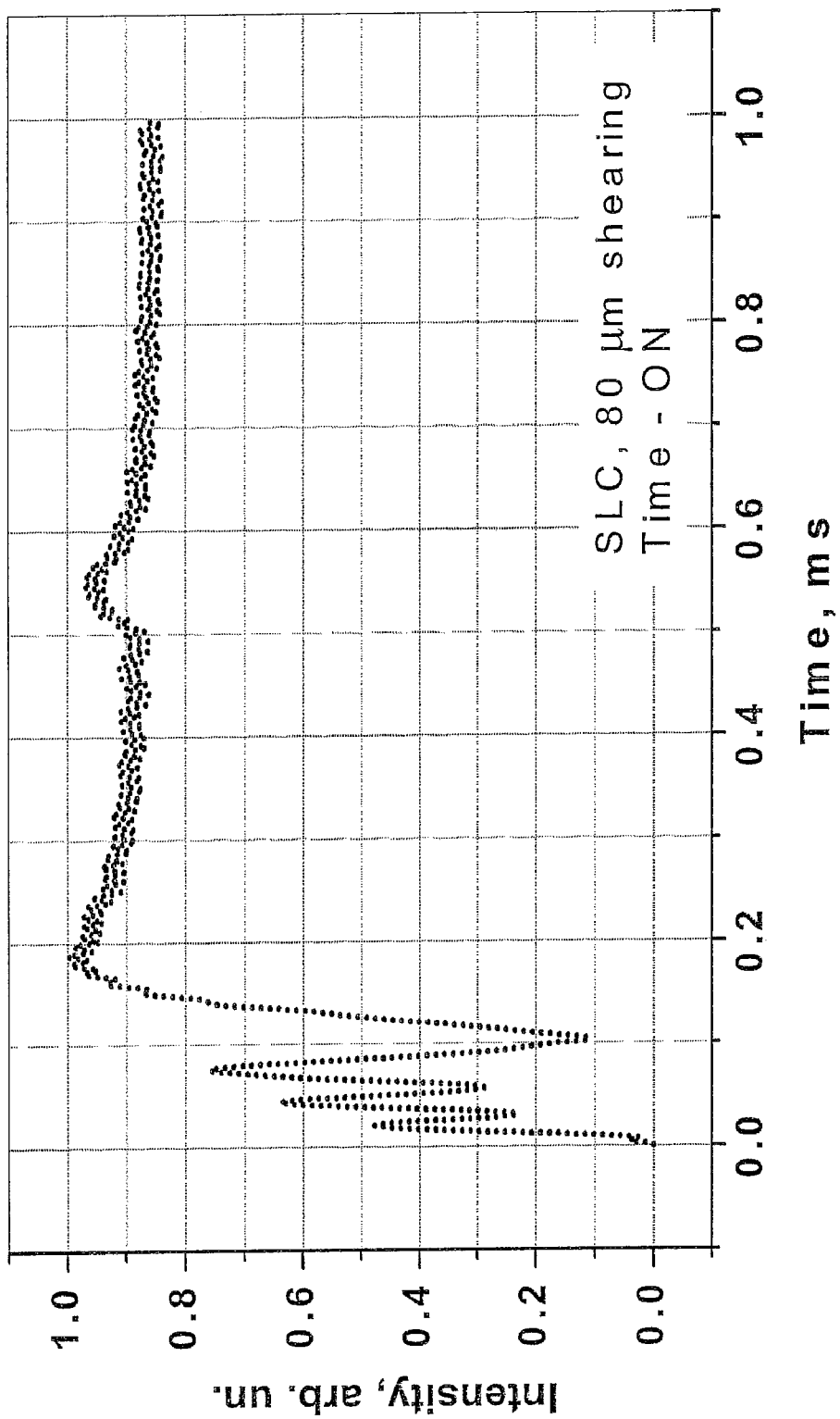
FIG. 19a shows the dynamics of the time ON for the SLC cell at the application of 100 V.
Figure 19B:
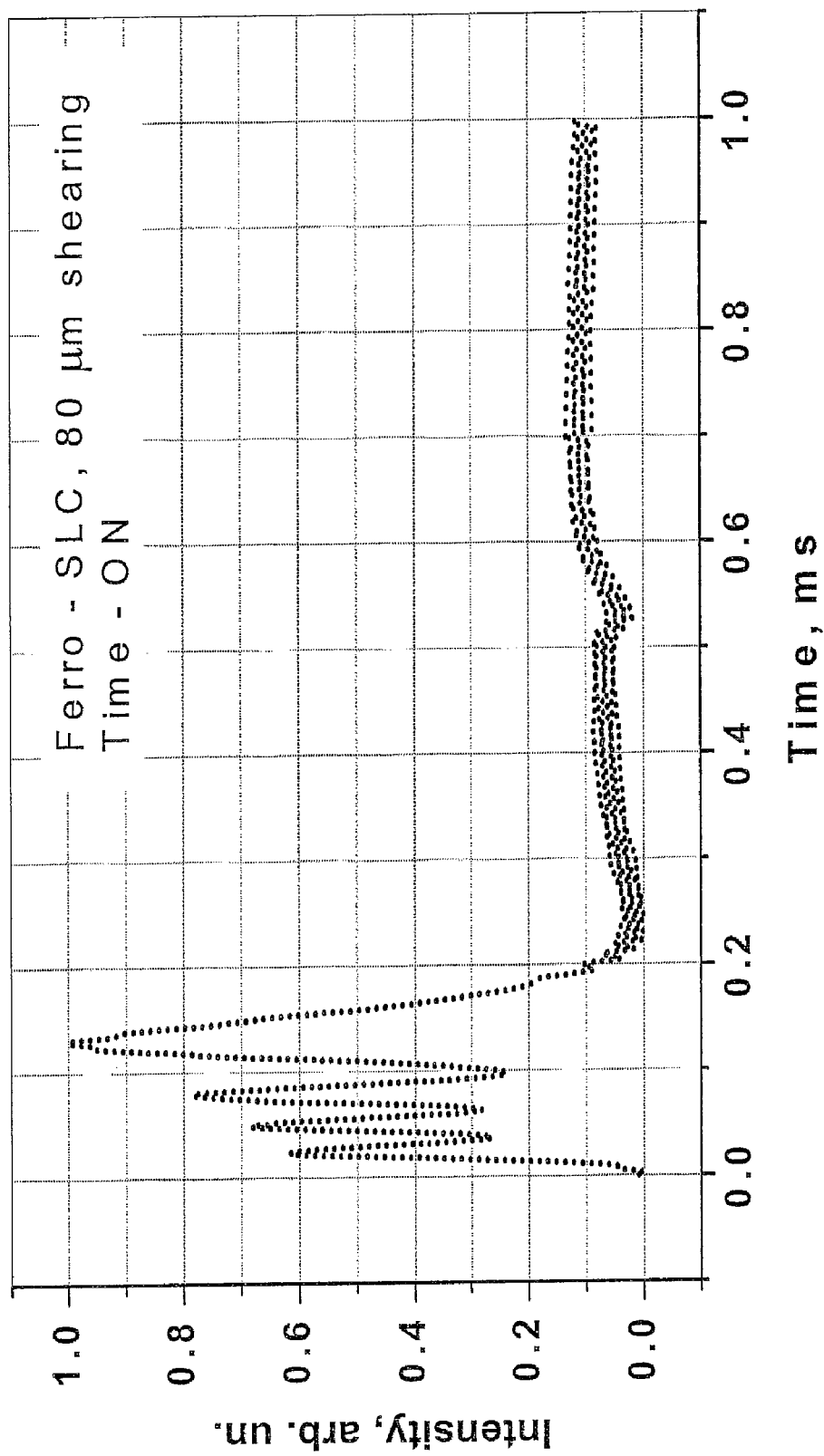
FIG. 19b shows the dynamics of the time ON for the ferro-SLC cell at the application of 100 V.
Figure 20A:
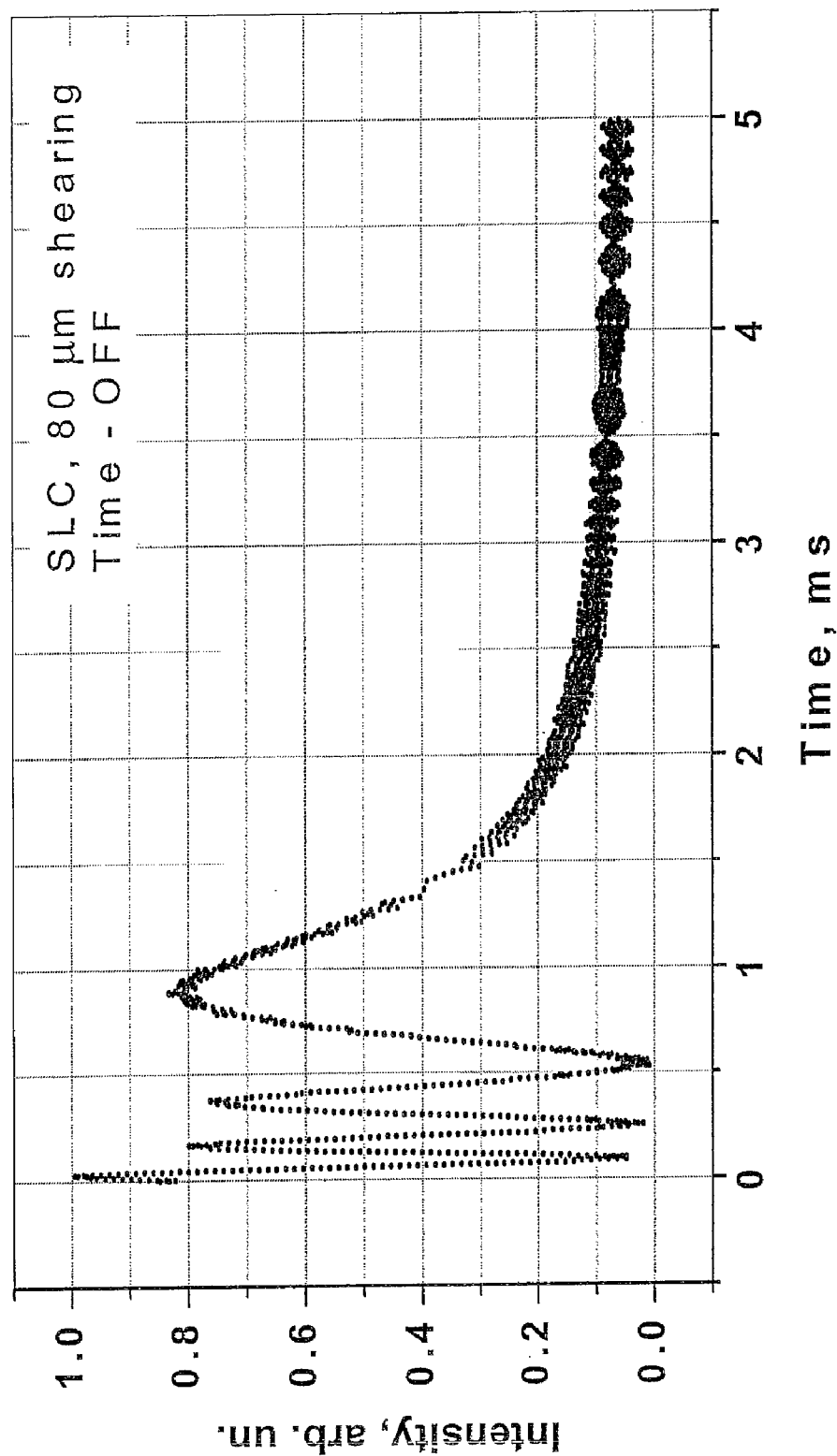
FIG. 20a shows the dynamics of the time OFF for the SLC cell after removing of 100 V.
Figure 20B:
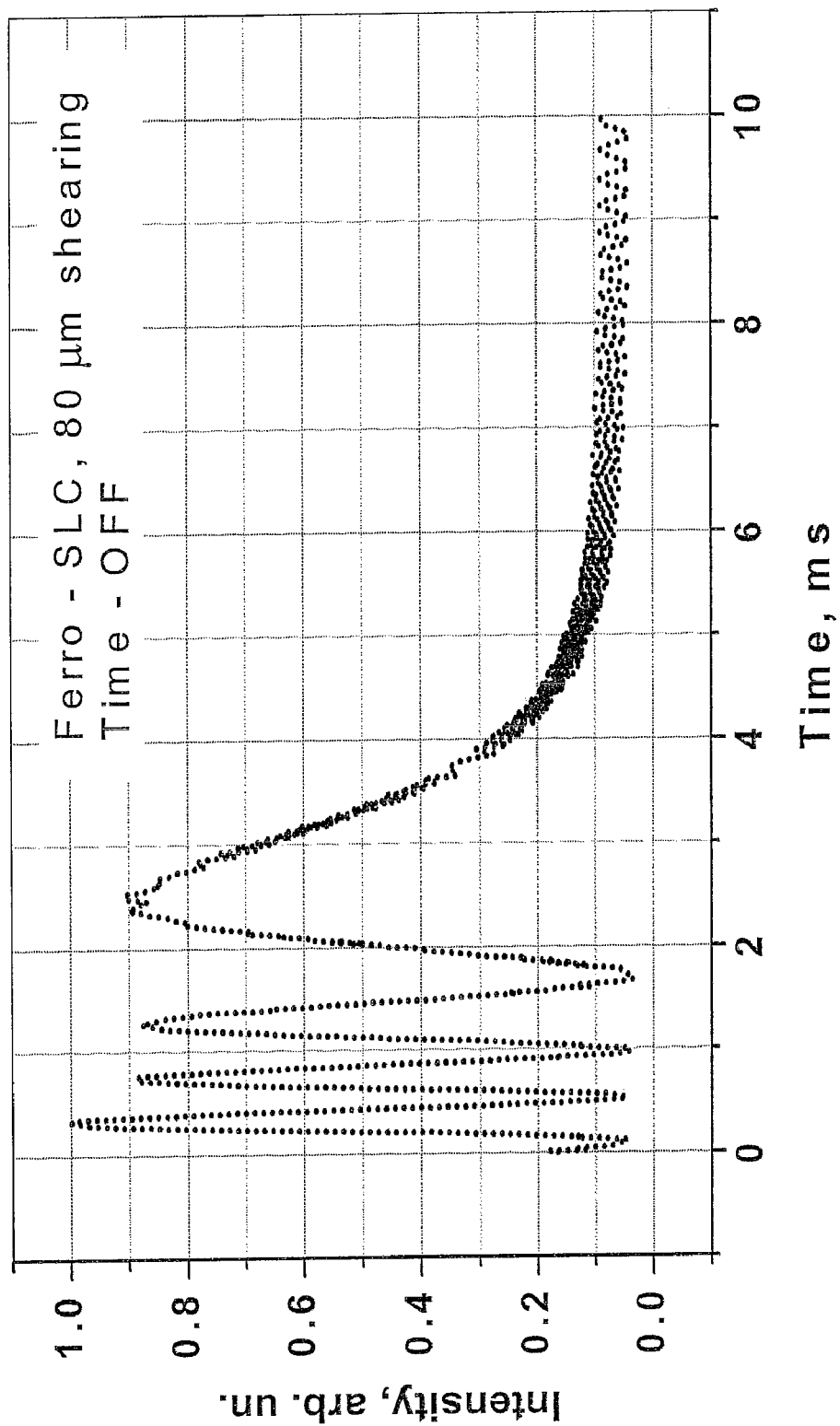
FIG. 20b shows the dynamics of the time OFF for the ferro-SLC cell after removing of 100 V.

FIG. 18 shows the dependence of the phase retardation as a function of an applied voltage for the SLC and the ferro-SLC films when the shearing distance is 80 μm. The cell's thickness is 22 μm. Such a larger shearing produces faster switching times. FIG. 19 shows that to switch ON 3.5λ=2.2 μm of the phase retardation the SLC cell requires about 180 μs while the ferro-SLC cell requires 130 μs. The dynamics of the relaxation of the SLC cell and the ferro-SLC cell after removing 100V is shown in FIG. 20. The relaxation time is almost the same for the both materials and is about 2 ms.

Example 4

Performance of a Smectic Liquid Crystal Doped with Ferroelectric Particles

In general, development of bistable displays is highly significant, because they maintain their optical states without an electrical field being applied, and are ideal for portable electronic devices. Bistability allows high resolution images to be produced using simple multiplex drive schemes. Examples of bistable displays, such as bistable reflective cholesteric displays, zenithal bistable displays (ZBD™), bistable SmC* ferroelectric displays, 360° BTN displays, and 180° bistable nematic (BiNem®) displays have been researched and well-documented. Another advanced approach that achieves a bistable switching is based on ion-doped SmA materials. The materials can be switched between stable homeotropic and focal conic textures by changing the frequency of an applied electric field. Application and removal of low frequency (<1 kHz) electric fields results in the formation of focal-conic scattering texture through electrohydrodynamic instability. However, at higher frequencies (>1 kHz), homeotropic texture forms due to the dielectric re-orientation of the smectic molecules. Bistability, wide viewing angles, and sunlight readability make smectic-A material devices based on this effect promising for a wide variety of applications.

Figure 21:
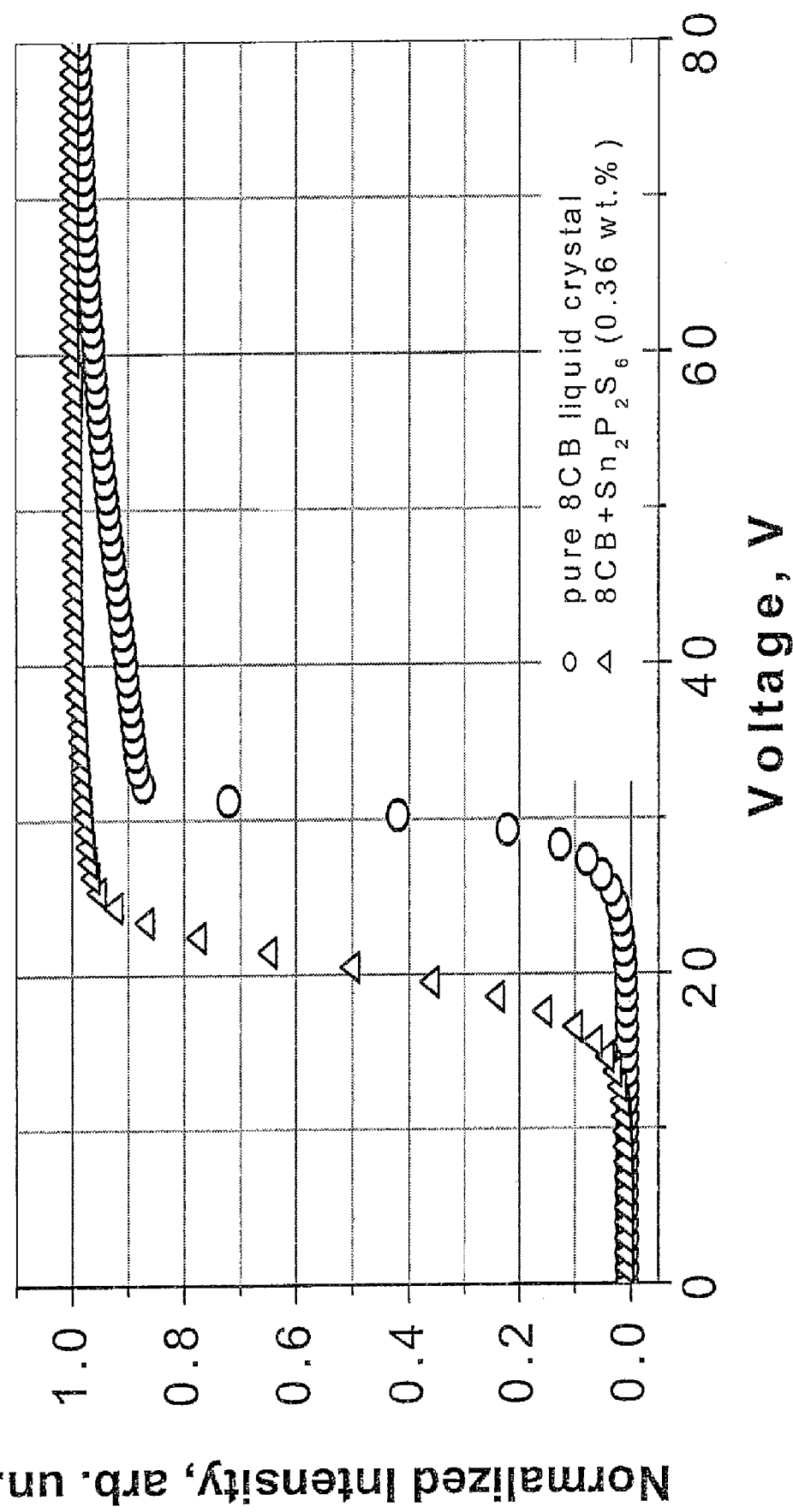
FIG. 21 is a comparison of the electro-optic response of the cells filled with pure SmA 8CB liquid crystal and a mixture of the 8CB with $Sn_2P_2S_6$ ferroelectric particles.

Therefore, a classical smectic A material (8CB) was considered. We studied positive ferroelectric particles to enhance the performance of 8CB while the liquid crystal is used in a bistable mode of optical switching. We produced scattering in a 16 μm thick cells by heating the cell above the clearing temperature and fast cooling into the smectic phase. Application of an electric field orients the liquid crystal in a homeotropic state and the scattering disappears. FIG. 18 shows dependence of the intensity of the light passing through such a cell as a function of applied voltage. The threshold voltage for a cell filled with the pure 8CB liquid crystal was almost 10 V higher then the corresponding voltage for a cell filled with the mixture of 8CB and Sn2P2S6 particles when their concentration was 0.36 wt. % (FIG. 21). The graph shows transition from chaotical orientation of the liquid crystal in the cells to its defect-less homeotropic orientation.

These experiments suggest that ferroelectric particles can improve the performance of many smectic liquid crystal devices, including bistable displays.

Example 5

Role of the Ferroelectric Particles in Performance of Cholesteric Bistable Displays We prepared cholesteric liquid crystal/$Sn_2P_2S_6$ ferroelectric particle suspensions and bistable cells using commercially available cholesteric liquid crystal BL118. A chiral agent was added to produce materials reflecting in the visible. A small percentage of the NOA65 monomer was then added and mixed uniformly into the cholesteric liquid crystal mixture before it was vacuum filled. An electric field is applied to the filled cell sufficient to align the liquid crystal molecules in the homeotropic state while ultraviolet radiation is applied to the cell. The photo-polymerized cell has two stable states: the highly reflecting quasiplanar (multi-domains with slightly different helix directions) texture and the weakly scattering (essentially non-reflecting) focal-conic texture.

Figure 22:
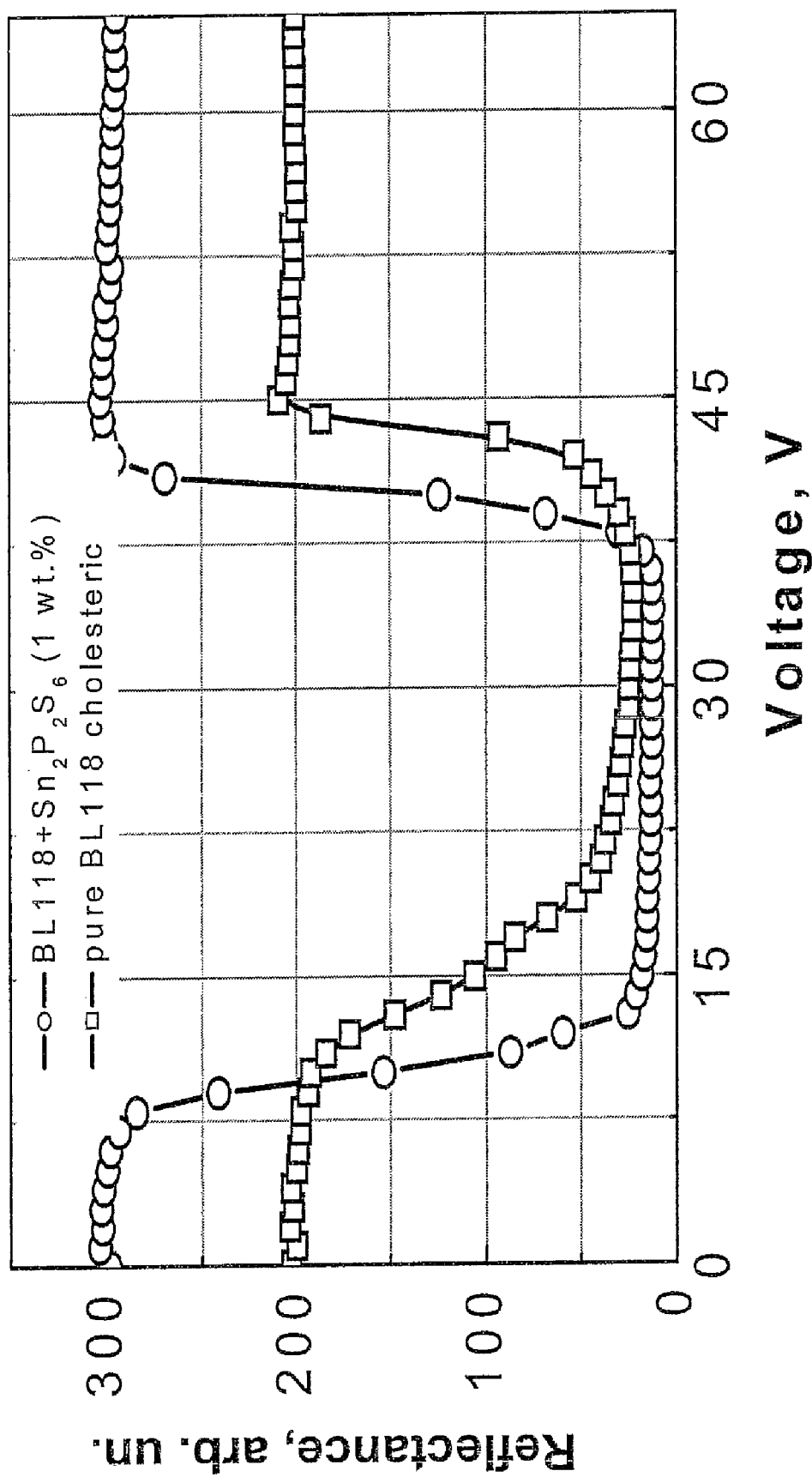
FIG. 22 shows the electro-optics of a cholesteric bistable cell made of pure BL118 cholesteric and a mixture of the BL118 liquid crystal with $Sn_2P_2S_6$ ferroelectric particles.
Figure 23:
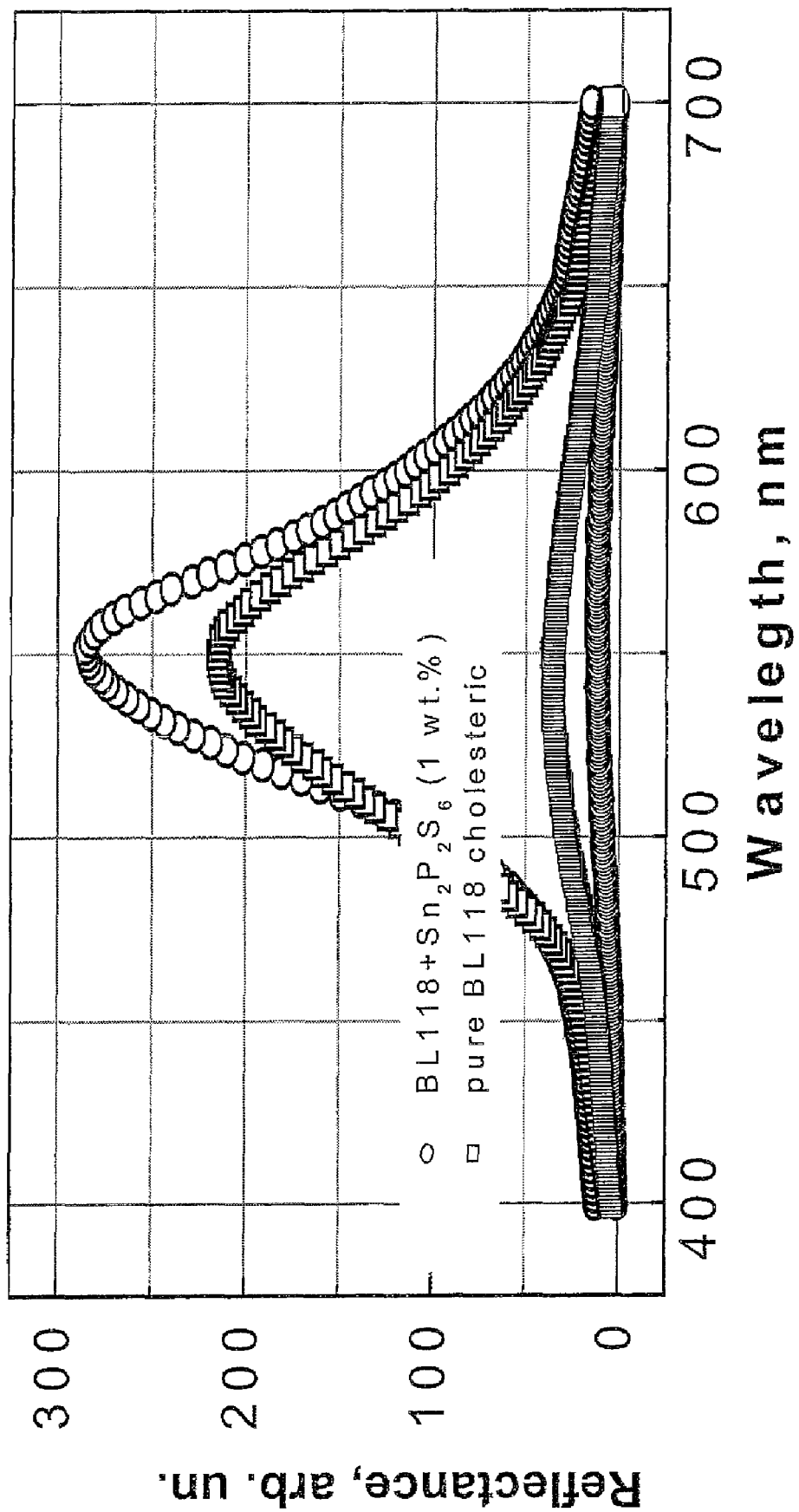
FIG. 23 are the reflectance measurements of the bistable cholesteric cell filled with pure BL118 cholesteric and a mixture of the BL118 liquid crystal with $Sn_2P_2S_6$ ferroelectric particles.

FIG. 22 shows the typical electro-optical curves of a cell filled with the pure cholesteric and the mixture of the cholesteric and the ferroparticles. The particles lower all the switching thresholds by several volts: planar to focal conic and focal conic to planar. The particles have a much larger affect on the appearance and contrast of the cells. As can be seen in FIG. 22 and in FIG. 23 the cells have a much higher reflectivity in the planar state and less scattering in the focal conic. In FIG. 22, the reflectance is measured 800 ms after the corresponding voltage with a 20 ms pulse width is applied and then grounded. The initial state was in the quasi-planar state. The cell with the particles demonstrates lower driving voltages, more abrupt changes of the reflectance vs. applied voltage and better contrast. This greatly increases the brightness and contrast of the cells and produces a much better display. This difference is likely due to the increase in the order parameter and in the alignment of the planar state.

The examples given above are intended to be illustrative only and the present invention was not limited to the conditions and materials noted therein. Various modifications can be achieved within the technical scope of the present invention. For example, the ferroelectric LC suspensions are not limited to a nematic matrix. Cholesteric, ferroelectric, as well as any kind of smectic LC's can be a base for the ferroelectric/LC suspensions. Also, ferroelectric/LC suspensions can be used as a LC material in Polymer Dispersed Liquid Crystal Devices.

What is claimed is:

1. A liquid crystal material comprising a suspension of inorganic anisotropic ferroelectric nanoparticles in a liquid crystal, wherein said ferroelectric nanoparticles function to change at least one of the following properties of the suspension when compared to the pure liquid crystal: a) the dielectric anisotropy; b) the phase transition temperature; c) the birefringence; and d) the order parameter.

2. A liquid crystal material as claimed in claim 1 wherein said liquid crystal is a nematic liquid crystal with a positive dielectric anisotropy.

3. A liquid crystal material as claimed in claim 1 wherein said liquid crystal is a nematic liquid crystal with a negative dielectric anisotropy.

4. A liquid crystal material as claimed in claim 1 wherein said liquid crystal is a two frequency nematic material wherein its dielectric anisotropy can be either positive or negative, depending on the frequency of an external applied electric filed.

5. A liquid crystal material as claimed in claim 1, additionally comprising a polymer to form either a polymer network structure, a PDLC-like structure, or a Stressed Liquid Crystal structure.

6. A liquid crystal material as claimed in claim 1 wherein said liquid crystal is a smectic liquid crystal.

7. A liquid crystal material as claimed in claim 1 wherein said liquid crystal is a cholesteric liquid crystal.

8. A liquid crystal material as claimed in claim 1 wherein said liquid crystal is a ferroelectric liquid crystal.

9. A liquid crystal material as claimed in claim 1 wherein said ferroelectric nanoparticles comprise at least one of $LiNbO_3$, $PbTiO_3$, $BaTiO_3$, and $Sn_2P_2S_6$.

10. A liquid crystal material as claimed in claim 1 wherein said ferroelectric nanoparticles have a Curie temperature of less than about 110° C.

11. A liquid crystal material as claimed in claim 1 wherein said ferroelectric nanoparticles have a dielectric an isotropy of between $10^3$ and $10^4$.

12. A liquid crystal material as claimed in claim 1 wherein an effective dielectric anisotropy of said suspension can range up to 100.

13. A liquid crystal material according to claim 1, wherein the nanoparticles are smaller than 1 μm in any dimension, on average.

14. A liquid crystal material according to claim 1, wherein said ferroelectric nanoparticles are suspended in the liquid crystal material at a percentage between 0.01 and 4 percent by weight compared to the liquid crystal material.

15. A method to change at least one property of a host liquid crystal by adding inorganic ferroelectric nanoparticles to said liquid crystal to create a suspension, wherein the amount of change can be controlled by altering the type, concentration, size of the ferroelectric nanoparticles, and/or suspension preparation conditions, said property selected from at least one of: a) the dielectric anisotropy; b) the phase transition temperature; c) the birefringence; and d) the order parameter.

16. A method for fabricating a liquid crystal material according to claim 1 by a process including the steps of: (i) milling large-sized or agglomerates of a ferroelectric powder into inorganic ferroelectric nanoparticles, optionally with a surfactant agent, in an organic solvent to create a stable suspension; (ii) mixing a desired fraction of the suspension with a liquid crystal material.

17. The method for fabricating a liquid crystal material according to claim 16, wherein said suspension of ferroelectric nanoparticles in a liquid crystal material additionally comprises a polymerizable material and wherein said method additionally comprises the step of inducing polymerization of the polymerizable material.

18. A liquid crystal device comprising: (i) a pair of opposed substrates, each substrate having an associated electrode facing the other substrate; and (ii) a liquid crystal material according to claim 1 disposed between said pair of substrates.

19. The liquid crystal device according to claim 18, additionally comprising an alignment material layer disposed on each of said electrodes, the alignment layer providing either planar, homeotropic, or tilted alignment for the liquid crystal material.

20. The liquid crystal device according to claim 18, wherein said liquid crystal is a nematic liquid crystal with a positive dielectric anisotropy.

21. The liquid crystal device according to claim 18, wherein said liquid crystal is a nematic liquid crystal with a negative dielectric anisotropy.

22. The liquid crystal device according to claim 18, wherein said liquid crystal is a two frequency nematic material wherein its dielectric anisotropy can be either positive or negative, depending on the frequency of an external applied electric filed.

23. The liquid crystal device according to claim 18, additionally comprising a polymer to form either a polymer network structure, a PDLC-like structure, or a Stressed Liquid Crystal structure.

24. The liquid crystal device according to claim 18, wherein said liquid crystal is a smectic liquid crystal.

25. The liquid crystal device according to claim 18, wherein said liquid crystal is a cholesteric liquid crystal.

26. The liquid crystal device according to claim 18, wherein said liquid crystal is a ferroelectric liquid crystal.

27. The liquid crystal device according to claim 18, wherein said ferroelectric nanoparticles comprise at least one of $LiNbO_3$, $PbTiO_3$, $BaTiO_3$, and $Sn_2P_2S_6$.

28. The liquid crystal device according to claim 18, wherein said ferroelectric nanoparticles have a Curie temperature of less than about 110° C.

29. The liquid crystal device according to claim 18, wherein said ferroelectric nanoparticles have a dielectric anisotropy of between $10^3$ and $10^4$.

30. The liquid crystal device according to claim 18, wherein an effective dielectric anisotropy of said suspension can range up to 100.

31. The liquid crystal device according to claim 18, wherein the nanoparticles are smaller than 1 μm in any dimension, on average.

32. The liquid crystal device according to claim 18, wherein said ferroelectric nanoparticles are suspended in the liquid crystal material at a percentage between 0.01 and 4 percent by weight compared to the liquid crystal material.

* * * * *